US012704991B2

(12) United States Patent
LeMay

(10) Patent No.: US 12,704,991 B2
(45) Date of Patent: Aug. 11, 2026

(54) CIRCUITRY AND METHODS FOR IMPLEMENTING CAPABILITY-BASED COMPARTMENT SWITCHES WITH DESCRIPTORS

(71) Applicant: Intel Corporation, Santa Clara, CA (US)

(72) Inventor: Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 17/559,908

(22) Filed: Dec. 22, 2021

(65) Prior Publication Data

US 2023/0195360 A1 Jun. 22, 2023

(51) Int. Cl.
*G06F 3/06* (2006.01)
*G06F 9/38* (2018.01)

(52) U.S. Cl.
CPC .......... *G06F 3/0655* (2013.01); *G06F 3/0604* (2013.01); *G06F 3/0679* (2013.01); *G06F 9/3818* (2013.01)

(58) Field of Classification Search
CPC .... G06F 3/0655; G06F 3/0604; G06F 3/0679; G06F 9/3818; G06F 9/30189;
(Continued)

(56) References Cited

U.S. PATENT DOCUMENTS 3,794,980 A 2/1974 Cogar et al.
3,916,385 A 10/1975 Parmar et al.
(Continued)

FOREIGN PATENT DOCUMENTS

EP 0428079 A2 5/1991
EP 3885901 A1 9/2021
(Continued)

OTHER PUBLICATIONS

European Search Report and Search Opinion, EP App. No. 22205974.3, Mar. 1, 2023, 10 pages.
(Continued)

*Primary Examiner* — Edward J Dudek, Jr.
(74) *Attorney, Agent, or Firm* — NICHOLSON DE VOS WEBSTER & ELLIOTT LLP

(57) ABSTRACT

Systems, methods, and apparatuses for implementing capability-based compartment switches with descriptors are described. In certain examples, a hardware processor core comprises a capability management circuit to check a capability for a memory access request, the capability comprising an address field and a bounds field that is to indicate a lower bound and an upper bound of an address range to which the capability authorizes access; a decoder circuit to decode a single instruction into a decoded single instruction, the single instruction comprising one or more fields to indicate a first compartment descriptor that identifies a first capability to a first state element in a first compartment of memory and a second capability to a second state element in the first compartment of the memory, and an opcode to indicate that an execution circuit is to load the first capability from the first compartment descriptor of the memory into a first register to enable the capability management circuit to determine whether a first bounds field of the first capability authorizes an access to the first state element in the first compartment of the memory, and load the second capability from the first compartment descriptor of the memory into a second register to enable the capability management circuit to determine that a second bounds field of the second capability authorizes an access to the second state element in the first compartment of the memory; and the execution circuit to execute the decoded single instruction according to the opcode.

21 Claims, 21 Drawing Sheets

(58) Field of Classification Search
CPC .... G06F 9/30043; G06F 9/30007; G06F 9/23; G06F 9/3012
See application file for complete search history.

(56) References Cited

U.S. PATENT DOCUMENTS

| | | | |
|---|---|---|---|
| 4,809,160 A | 2/1989 | Mahon et al. | |
| 4,821,169 A | 4/1989 | Sites et al. | |
| 5,287,309 A | 2/1994 | Kai | |
| 5,499,349 A | 3/1996 | Nikhil et al. | |
| 5,809,564 A | 9/1998 | Craze et al. | |
| 5,862,400 A | 1/1999 | Reed et al. | |
| 6,009,503 A | 12/1999 | Liedtke | |
| 6,048,940 A | 4/2000 | Blaedel et al. | |
| 6,128,728 A | 10/2000 | Dowling | |
| 6,671,699 B1 | 12/2003 | Black et al. | |
| 6,694,450 B1 | 2/2004 | Kidder et al. | |
| 6,823,433 B1 | 11/2004 | Barnes et al. | |
| 7,086,088 B2 | 8/2006 | Narayanan | |
| 7,401,234 B2 | 7/2008 | Case et al. | |
| 7,581,089 B1 | 8/2009 | White | |
| 8,554,984 B2 | 10/2013 | Yano et al. | |
| 8,595,442 B1 | 11/2013 | James-Roxby et al. | |
| 9,026,866 B2 | 5/2015 | Balasubramanian | |
| 9,390,031 B2 | 7/2016 | Durham et al. | |
| 9,436,847 B2 | 9/2016 | Durham et al. | |
| 9,501,637 B2 | 11/2016 | Lemay et al. | |
| 9,652,375 B2 * | 5/2017 | Stark | G06F 11/1076 |
| 10,162,694 B2 | 12/2018 | Stark et al. | |
| 11,030,113 B1 | 6/2021 | Durham et al. | |
| 2002/0019902 A1 | 2/2002 | Christie | |
| 2003/0196076 A1 | 10/2003 | Zabarski et al. | |
| 2004/0031030 A1 | 2/2004 | Kidder et al. | |
| 2004/0158775 A1 | 8/2004 | Shibuya et al. | |
| 2004/0221141 A1 | 11/2004 | Padmanabhan et al. | |
| 2005/0044292 A1 | 2/2005 | Mckeen | |
| 2005/0193217 A1 | 9/2005 | Case et al. | |
| 2006/0187941 A1 | 8/2006 | Andersen | |
| 2006/0256877 A1 | 11/2006 | Szczepanek et al. | |
| 2006/0256878 A1 | 11/2006 | Szczepanek et al. | |
| 2007/0055837 A1 | 3/2007 | Rajagopal et al. | |
| 2008/0209282 A1 | 8/2008 | Lee et al. | |
| 2009/0271536 A1 | 10/2009 | Tiennot | |
| 2009/0292977 A1 | 11/2009 | Bradley et al. | |
| 2009/0320129 A1 | 12/2009 | Pan et al. | |
| 2010/0115243 A1 | 5/2010 | Kissell | |
| 2010/0162038 A1 | 6/2010 | Hulbert et al. | |
| 2010/0293342 A1 | 11/2010 | Morfey et al. | |
| 2012/0030392 A1 | 2/2012 | Norden et al. | |
| 2012/0036299 A1 | 2/2012 | Renno | |
| 2012/0036341 A1 | 2/2012 | Morfey et al. | |
| 2013/0318322 A1 | 11/2013 | Shetty et al. | |
| 2013/0326288 A1 | 12/2013 | Datta et al. | |
| 2014/0115283 A1 | 4/2014 | Radovic et al. | |
| 2014/0281354 A1 | 9/2014 | Tkacik et al. | |
| 2014/0283088 A1 | 9/2014 | Alharbi et al. | |
| 2014/0365742 A1 | 12/2014 | Patel et al. | |
| 2014/0372698 A1 | 12/2014 | Lee et al. | |
| 2015/0278516 A1 | 10/2015 | Caprioli | |
| 2016/0048378 A1 | 2/2016 | Varma | |
| 2016/0124802 A1 | 5/2016 | Gabor et al. | |
| 2016/0259682 A1 | 9/2016 | Stark et al. | |
| 2016/0283300 A1 | 9/2016 | Stark et al. | |
| 2016/0371139 A1 | 12/2016 | Stark et al. | |
| 2016/0381050 A1 | 12/2016 | Shanbhogue et al. | |
| 2017/0177339 A1 | 6/2017 | Shanbhogue et al. | |
| 2017/0177429 A1 | 6/2017 | Stark et al. | |
| 2017/0228535 A1 | 8/2017 | Shanbhogue et al. | |
| 2018/0060250 A1 | 3/2018 | Hildesheim et al. | |
| 2018/0074715 A1 | 3/2018 | Farmahini-Farahani et al. | |
| 2018/0253310 A1 * | 9/2018 | Stephens | G06F 9/30043 |
| 2019/0057093 A1 * | 2/2019 | Caulfield | G06F 16/24578 |
| 2020/0004550 A1 * | 1/2020 | Thakker | G06F 9/30043 |
| 2020/0004953 A1 | 1/2020 | Lemay et al. | |
| 2021/0200546 A1 | 7/2021 | Lemay et al. | |
| 2021/0294607 A1 * | 9/2021 | Abhishek Raja | G06F 9/30043 |
| 2024/0086579 A1 * | 3/2024 | Ayrapetyan | G06F 21/52 |

FOREIGN PATENT DOCUMENTS

| | | | |
|---|---|---|---|
| JP | 03-244054 | A | 10/1991 |
| KR | 10-2008-0075175 | A | 8/2008 |
| WO | 2007/079011 | A3 | 11/2007 |

OTHER PUBLICATIONS

Advisory Action from U.S. Appl. No. 11/323,446, Apr. 17, 2012, 3 pages.

Angelo-Oracle. "SPARC M7 Chip-32 cores", Oracle.com, Aug. 15, 2014. Web. Accessed Dec. 21, 2015. 8 pages. URL: <http://blogs.oracle.com/rajadurai/entry/sparc_m7_chip_32_cores>.

Arm, "Arm® Architecture Reference Manual Supplement Morello for A-profile Architecture", Document No. DDI0606, Document Version: A.j, 2019-2021, 1288 pages.

Biin: "CPA Architecture Reference Manual", 1988, 401 pages.

Burow et al., "CUP: Comprehensive User-Space Protection for C/C++", Session 9: Software Security, ASIACCS'18, Jun. 4-8, 2018, pp. 381-392.

Carr et al., "DataShield: Configurable Data Confidentiality and Integrity", ASIA CCS '17, Apr. 2-6, 2017, pp. 193-204.

Chen et al., "Shreds: Fine-grained Execution Units with Private Memory", IEEE Symposium on Security and Privacy, 2016, pp. 56-71.

Cheri, "Capability Hardware Enhanced RISC Instructions (CHERI)", available online at <https://www.cl.cam.ac.uk/research/security/ctsrd/cheri/>, 2010-2019, 2 pages.

Dartmouth, "ELFbac: Runtime Intent-Level ABI-Granular Memory Protection for Linux", available online at <https://www.cs.dartmouth.edu/~sergey/io/elfbac/>, retrieved on May 1, 2020, 1 page.

Duarte, "Memory Translation and Segmentation" Aug. 2008, p. 1-7.

Duck et al., "EffectiveSan: Type and Memory Error Detection using Dynamically Typed C/C++", PLDI'18, Jun. 18-22, 2018, pp. 181-195.

Final Office Action from U.S. Appl. No. 11/323,446, Dec. 30, 2011, 18 pages.

Final Office Action from U.S. Appl. No. 11/323,446, Jan. 17, 2013, 17 pages.

Final Office Action from U.S. Appl. No. 11/323,446, Jul. 16, 2015, 17 pages.

Final Office Action from U.S. Appl. No. 11/323,446, Jul. 28, 2014, 16 pages.

Final Office Action from U.S. Appl. No. 11/323,446, Jul. 7, 2009, 21 pages.

Final Office Action from U.S. Appl. No. 11/323,446, Oct. 15, 2010, 17 pages.

Final Office Action from U.S. Appl. No. 11/323,446, Sep. 20, 2013, 14 pages.

Final Office action, U.S. Appl. No. 14/752,221, Mar. 7, 2018, 28 pages.

Gil et al., "There's a Hole in the Bottom of the C: On the Effectiveness of Allocation Protection", IEEE Cybersecurity Development (SecDev), Sep. 30-Oct. 2, 2018, 8 pages.

Gove, D., et al., "Detecting memory access errors," Nov. 25, 2015, 17 pages.

Gretton-Dann et al., "Arm A-Profile Architecture Developments 2018: Armv8.5-A", available online at <https://community.arm.com/developer/ip-products/processors/b/processors-ip-blog/posts/arm-a-profile-architecture-2018-developments-armv85a>, Sep. 17, 2018, 5 pages.

https://courses.cs.washington.edu/courses/cse351/17wi/lectures/CSE351-L02-memory-L17wi.pdfAuthor: Ceze; Title: CSE351:Memory, Data, & Addressing I, Date: Winter, 2017 (Year: 2017).

Intel, "Intel 64 and IA-32 Architectures Software Developer's Manual", vol. 3A, System Programming Guide, Part 1, Order No. 253668-060US, Sep. 2016, 468 pages.

(56) References Cited

OTHER PUBLICATIONS

International Preliminary Report on Patentability for Application No. PCT/US2006/048940, Jul. 1, 2008, 8 pages.
International Search Report and Written Opinion for Application No. PCT/US2006/048940, Sep. 25, 2007, 15 pages.
International Search Report and Written Opinion for Application No. PCT/US2016/063211, Mar. 7, 2017, 11 pages.
International Search Report and Written Opinion for Application No. PCT/US2017/012572, Apr. 4, 2017, 13 pages.
International Search Report and Written Opinion, PCT App. No. PCT/US2016/063207, Feb. 27, 2017, 9 pages.
International Search Report and Written Opinion, PCT App. No. PCT/US2016/034364, Sep. 13, 2016, 12 pages.
Introduction to SPARC M7 and Silicon Secured Memory (SSM), Retrieved from https://swisdev.oracle.com/_files/What-Is-SSM.html on Jul. 4, 2016, 2 pages.
Jeon et a., "HexType: Efficient Detection of Type Confusion Errors for C++", CCS '17, Session K3: Program Analysis, Oct. 2017, pp. 2373-2387.
Kwon et al., "Low-Fat Pointers: Compact Encoding and Efficient Gate-Level Implementation of Fat Pointers for Spatial Safety and Capability-based Security", Proceedings of the 2013 ACM SIGAC Conference on Computer & Communications Security, 2013, pp. 721-732.
Liljestrand et al., "PAC it up: Towards Pointer Integrity using ARM Pointer Authentication", Cornell University, Nov. 22, 2018, 21 pages.
LogMeln Support, "What is Privilege Separation in SSH?", available online at <https://web.archive.org/web/20191218064501/https://help.logmein.com/articles/en_US/FAQ/What-is-Privilege-Separation-in-SSH-en1>, Dec. 18, 2019, 1 page.
M. Rutland, "ARMv8.3 Pointer Authentication",, Linux Security Summit, Sep. 14, 2017, 24 slides.
Mahon M.J., et al., "Hewlett-Packard Precision Architecture: The Processor," Hewlett-Packard Journal, Aug. 1986, 19 pages.
Mcilroy et al., "Spectre is Here to Stay: An Analysis of Side-Channels and Speculative Execution", Cornell University, Feb. 15, 2019, pp. 1-26.
Menon et al., "Shakti-T: A RISC-V Processor with Light Weight Security Extensions", Conference: the Hardware and Architectural Support for Security and Privacy, Jun. 25, 2017, 9 pages.
Miller, Matt, "Trends, Challenges, and Strategic Shifts in the Software Vulnerability Mitigation Landscape", Microsoft Security Response Center (MSRC), Feb. 7, 2019, 32 pages.
Min R., et al., "Improving Performance of Large Physically Indexed Caches by Decoupling Memory Addresses From Cache Addresses," IEEE Transactions on Computers, vol. 50, No. 11, Nov. 2001, pp. 1191-1201.
Nagarakatte et al., "CETS: Compiler-Enforced Temporal Safety for C", ISMM'10, Jun. 5-6, 2010, pp. 31-40.
Non-Final Office Action from U.S. Appl. No. 11/323,446, Apr. 23, 2010, 16 pages.
Non-Final Office Action from U.S. Appl. No. 11/323,446, Jan. 15, 2015, 18 pages.
Non-Final Office Action from U.S. Appl. No. 11/323,446, Jun. 22, 2012, 16 pages.
Non-Final Office Action from U.S. Appl. No. 11/323,446, Jun. 7, 2013, 18 pages.
Non-Final Office Action from U.S. Appl. No. 11/323,446, Mar. 15, 2011, 16 pages.
Non-Final Office Action from U.S. Appl. No. 11/323,446, Mar. 20, 2014, 15 pages.
Non-Final Office Action from U.S. Appl. No. 11/323,446, Nov. 5, 2015, 5 pages.
Non-Final Office Action from U.S. Appl. No. 11/323,446, Oct. 7, 2008, 17 pages.
Non-final Office Action, U.S. Appl. No. 14/752,221, May 8, 2017, 23 pages.
Non-Final Office Action, U.S. Appl. No. 16/729,358, Sep. 16, 2020, 17 pages.
Notice of Allowance from U.S. Appl. No. 11/323,446, Mar. 14, 2016, 5 pages.
Notice of Allowance, U.S. Appl. No. 14/975,840, May 7, 2019, 9 pages.
Notice of Allowance, U.S. Appl. No. 16/729,358, Jul. 6, 2021, 8 pages.
Qualcomm, "Pointer Authentication on ARMv8.3: Design and Analysis of the New Software Security Instructions", Jan. 2017, 12 pages.
Rajadurai A., "SPARC M7 Chip—32 cores—Mind Blowing performance," Oracle Angelo's Soapbox Blog, Aug. 15, 2014, downloaded from https://blogs.oracle.com/rajadurai/sparc-m7-chip-32-cores-mind-blowing-performance-v2 on Aug. 10, 2017, 7 pages.
Serebryany et al., "AddressSanitizer: A Fast Address Sanity Checker", 2012 Usenix Annual Technical Conference, Jun. 13-15, 2012, 10 pages.
Serebryany et al., "Memory Tagging And How It Improves C/C++ Memory Safety", Feb. 2018, 14 pages.
Serebryany et al., "Memory Tagging: How It Improves C/C++ Memory Safety" Google, LLVM Developers' Meeting, Oct. 2018, 29 slides.
Serebryany, Kostya, "Arm Memory Tagging Extension and How It Improves C/C++ Memory Safety", available online at <https://www.usenix. org/publications/login/summer2019/serebryany>, Security, vol. 44, No. 2, 2019. 5 pages.
Serebryany, Kostya, "Security: ARM Memory Tagging Extension and How It Improves C/C++ Memory Safety", vol. 44, No. 2, Summer 2019, pp. 12-16.
Suh et al., "Secure Program Execution via Dynamic Information Flow Tracking", ASPLOS'04, Oct. 9-13, 2004, pp. 85-96.
T. Nyman et al., "HardScope: Thwarting DOP attacks with Hardware-Assisted Run-time Scope Enforcement", May 2017, pp. 1-20.
The Chromium Projects, "Multi-Process Architecture", available online at <https://web.archive.org/web/20191030200549/https://www.chromium.org/developers/design-documents/multi-process-architecture>, Oct. 30, 2019, 2 pages.
Tsampas et al., "Towards Automatic Compartmentalization of C Programs on Capability Machines", In Proceedings of the International Conference on Foundations of Computer Science, 2017, 14 pages.
Vasilakis et al., "BreakApp: Automated, Flexible Application Compartmentalization", Network and Distributed Systems Security (NDSS) Symposium, Feb. 18-21, 2018, 15 pages.
Watson et al., "An Introduction to CHERI", University of Cambridge, Computer Laboratory, Technical Report, No. 941, Sep. 2019, 43 pages.
Watson et al., "Capability Hardware Enhanced RISC Instructions: CHERI Instruction-Set Architecture (Version 8)", University of Cambridge, Computer Laboratory, Technical Report, No. 951, Oct. 2020, 590 pages.
Watson et al., "Cheri: A Hybrid Capability-System Architecture for Scalable Software Compartmentalization", IEEE Symposium on Security and Privacy, 2015, pp. 20-37.
Watson, "Capsicum: Practical capabilities for UNIX", USENIX Security, 2010, 17 pages.
Wesley et al., "Cornucopia: Temporal Safety for CHERI Heaps", . In Proceedings of the 41st IEEE Symposium on Security and Privacy, 2020, pp. 1507-1524.
Wilkes J., et al., "A Comparison of Protection Lookaside Buffers and the PA-RISC Protection Architecture," Mar. 1992, Hewlett-Packard, 12 pages.
Xia et al., "CHERIvoke: Characterising Pointer Revocation using CHERI Capabilities for Temporal Memory Safety", MICRO '52, Oct. 2019, pp. 545-557.
Intention to Grant, EP App. No. 22205974.3, Mar. 31, 2025, 6 pages.

* cited by examiner

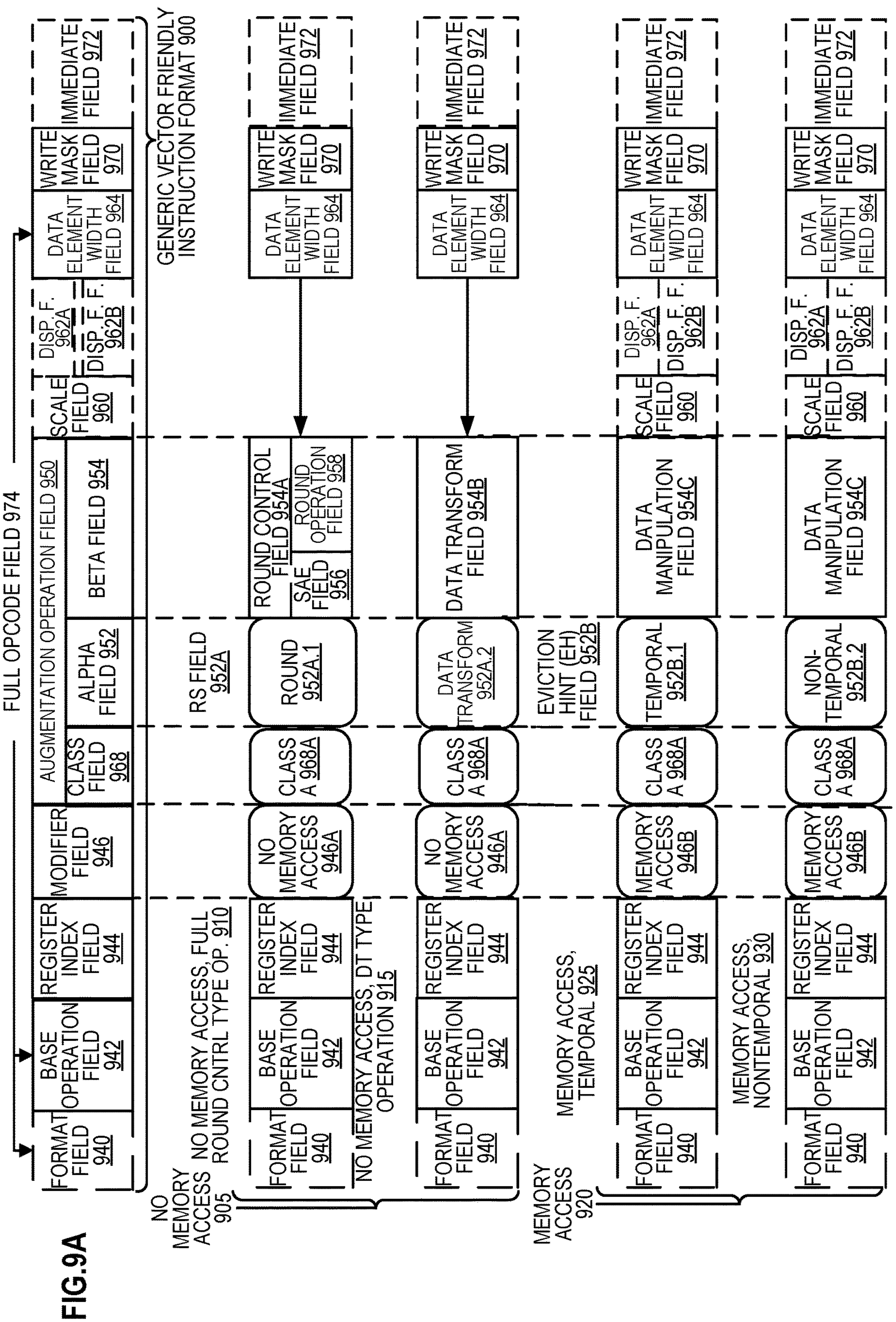

FIG.9A
FULL OPCODE FIELD 974
AUGMENTATION OPERATION FIELD 950
FORMAT FIELD 940
BASE OPERATION FIELD 942
REGISTER INDEX FIELD 944
MODIFIER FIELD 946
CLASS FIELD 968
ALPHA FIELD 952
BETA FIELD 954
SCALE FIELD 960
DISP. F. 962A
DISP. F. F. 962B
DATA ELEMENT WIDTH FIELD 964
WRITE MASK FIELD 970
IMMEDIATE FIELD 972
GENERIC VECTOR FRIENDLY INSTRUCTION FORMAT 900
NO MEMORY ACCESS 905
NO MEMORY ACCESS, FULL ROUND CNTRL TYPE OP. 910
RS FIELD 952A
NO MEMORY ACCESS 946A
CLASS A 968A
ROUND 952A.1
ROUND CONTROL FIELD 954A
SAE FIELD 956
ROUND OPERATION FIELD 958
NO MEMORY ACCESS, DT TYPE OPERATION 915
DATA TRANSFORM 952A.2
DATA TRANSFORM FIELD 954B
MEMORY ACCESS 920
MEMORY ACCESS, TEMPORAL 925
EVICTION HINT (EH) FIELD 952B
MEMORY ACCESS 946B
TEMPORAL 952B.1
DATA MANIPULATION FIELD 954C
MEMORY ACCESS, NONTEMPORAL 930
NON-TEMPORAL 952B.2

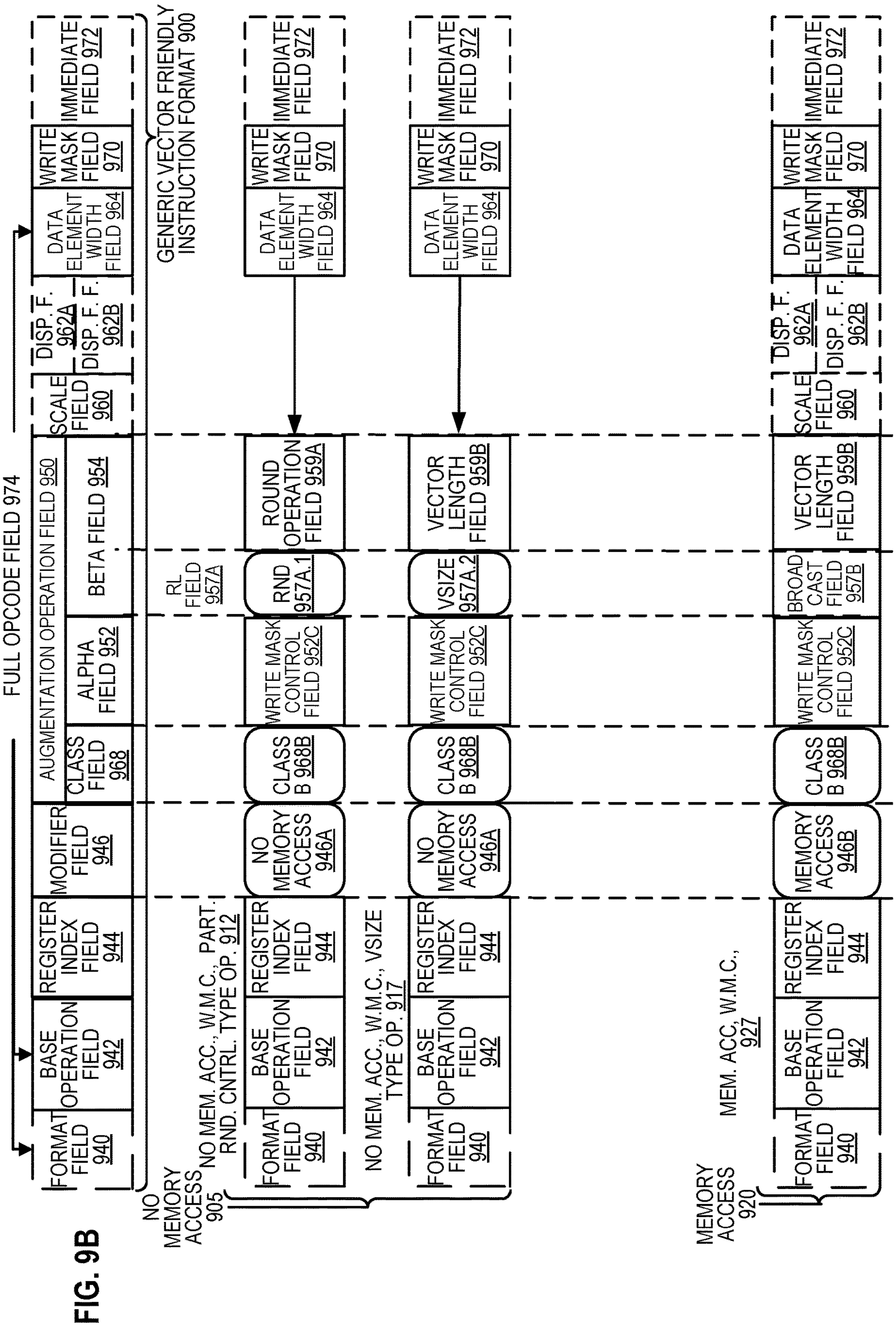

FIG. 9B
FULL OPCODE FIELD 974
FORMAT FIELD 940
BASE OPERATION FIELD 942
REGISTER INDEX FIELD 944
MODIFIER FIELD 946
AUGMENTATION OPERATION FIELD 950
CLASS FIELD 968
ALPHA FIELD 952
BETA FIELD 954
SCALE FIELD 960
DISP. F. 962A
DISP. F. F. 962B
DATA ELEMENT WIDTH FIELD 964
WRITE MASK FIELD 970
IMMEDIATE FIELD 972
GENERIC VECTOR FRIENDLY INSTRUCTION FORMAT 900
NO MEMORY ACCESS 905
NO MEM. ACC., W.M.C., PART. RND. CNTRL. TYPE OP. 912
RL FIELD 957A
NO MEMORY ACCESS 946A
CLASS B 968B
WRITE MASK CONTROL FIELD 952C
RND 957A.1
ROUND OPERATION FIELD 959A
NO MEM. ACC., W.M.C., VSIZE TYPE OP. 917
VSIZE 957A.2
VECTOR LENGTH FIELD 959B
MEMORY ACCESS 920
MEM. ACC, W.M.C., 927
MEMORY ACCESS 946B
BROAD CAST FIELD 957B

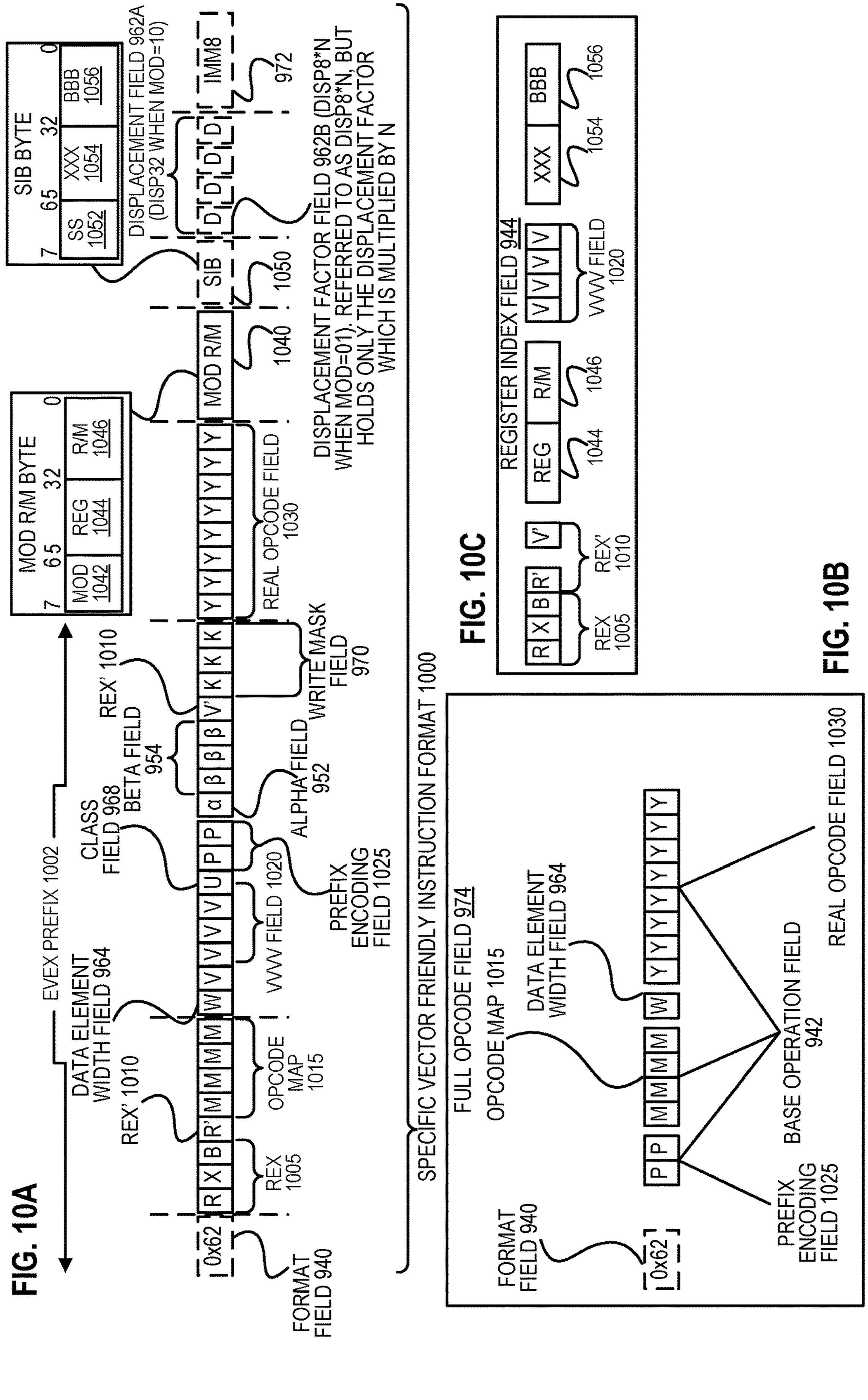

EVEX PREFIX 1002
MOD R/M BYTE
7 65 32 0
MOD 1042
REG 1044
R/M 1046
SIB BYTE
7 65 32 0
SS 1052
XXX 1054
BBB 1056
DATA ELEMENT WIDTH FIELD 964
REX' 1010
CLASS FIELD 968
BETA FIELD 954
REX' 1010
DISPLACEMENT FIELD 962A (DISP32 WHEN MOD=10)
0x62
R X B R' M M M M W V V V V U P P α β β β V' K K K Y Y Y Y Y Y Y Y
MOD R/M
SIB
D D D D
IMM8
FORMAT FIELD 940
REX 1005
OPCODE MAP 1015
VVVV FIELD 1020
PREFIX ENCODING FIELD 1025
ALPHA FIELD 952
WRITE MASK FIELD 970
REAL OPCODE FIELD 1030
1040
1050
972
DISPLACEMENT FACTOR FIELD 962B (DISP8*N WHEN MOD=01). REFERRED TO AS DISP8*N, BUT HOLDS ONLY THE DISPLACEMENT FACTOR WHICH IS MULTIPLIED BY N
SPECIFIC VECTOR FRIENDLY INSTRUCTION FORMAT 1000
FULL OPCODE FIELD 974
FORMAT FIELD 940
OPCODE MAP 1015
DATA ELEMENT WIDTH FIELD 964
0x62
P P M M M M W Y Y Y Y Y Y Y Y
PREFIX ENCODING FIELD 1025
BASE OPERATION FIELD 942
REAL OPCODE FIELD 1030
REGISTER INDEX FIELD 944
R X B R' V'
REG R/M
V V V V
XXX BBB
REX 1005
REX' 1010
1044
1046
VVVV FIELD 1020
1054
1056

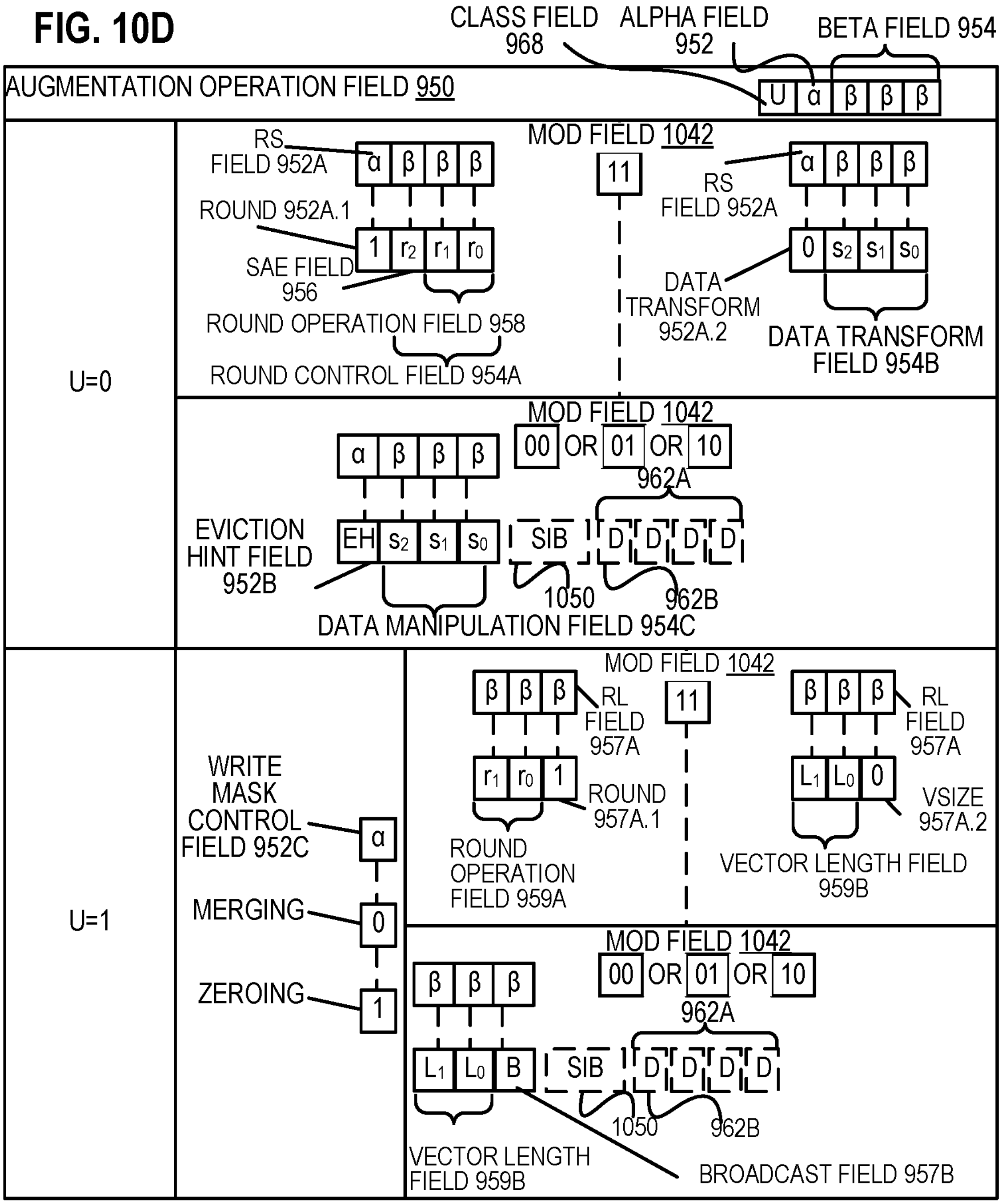

FIG. 10D
CLASS FIELD 968
ALPHA FIELD 952
BETA FIELD 954
AUGMENTATION OPERATION FIELD 950
U α β β β
U=0
RS FIELD 952A
MOD FIELD 1042
11
ROUND 952A.1
SAE FIELD 956
ROUND OPERATION FIELD 958
ROUND CONTROL FIELD 954A
DATA TRANSFORM 952A.2
DATA TRANSFORM FIELD 954B
00 OR 01 OR 10
962A
EVICTION HINT FIELD 952B
EH
SIB
D D D D
1050
962B
DATA MANIPULATION FIELD 954C
U=1
WRITE MASK CONTROL FIELD 952C
MERGING
ZEROING
RL FIELD 957A
ROUND 957A.1
ROUND OPERATION FIELD 959A
VSIZE 957A.2
VECTOR LENGTH FIELD 959B
BROADCAST FIELD 957B

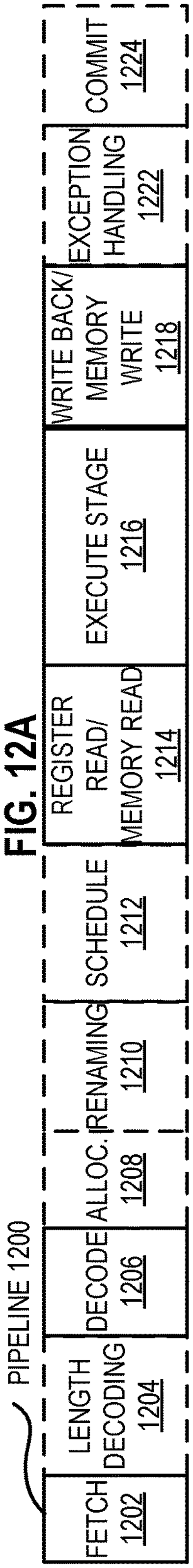

FIG. 12A
PIPELINE 1200
FETCH 1202
LENGTH DECODING 1204
DECODE 1206
ALLOC. 1208
RENAMING 1210
SCHEDULE 1212
REGISTER READ/ MEMORY READ 1214
EXECUTE STAGE 1216
WRITE BACK/ MEMORY WRITE 1218
EXCEPTION HANDLING 1222
COMMIT 1224
CORE 1290
FRONT END UNIT 1230
BRANCH PREDICTION UNIT 1232
INSTRUCTION CACHE UNIT 1234
INSTRUCTION TLB UNIT 1236
INSTRUCTION FETCH 1238
DECODE UNIT 1240
EXECUTION ENGINE UNIT 1250
RENAME / ALLOCATOR UNIT 1252
RETIREMENT UNIT 1254
SCHEDULER UNIT(S) 1256
PHYSICAL REGISTER FILES UNIT(S) 1258
EXECUTION CLUSTER(S) 1260
EXECUTION UNIT(S) 1262
MEMORY ACCESS UNIT(S) 1264
MEMORY UNIT 1270
DATA TLB UNIT 1272
DATA CACHE UNIT 1274
L2 CACHE UNIT 1276
PREFETCH CIRCUIT 1278
MEMORY 1280

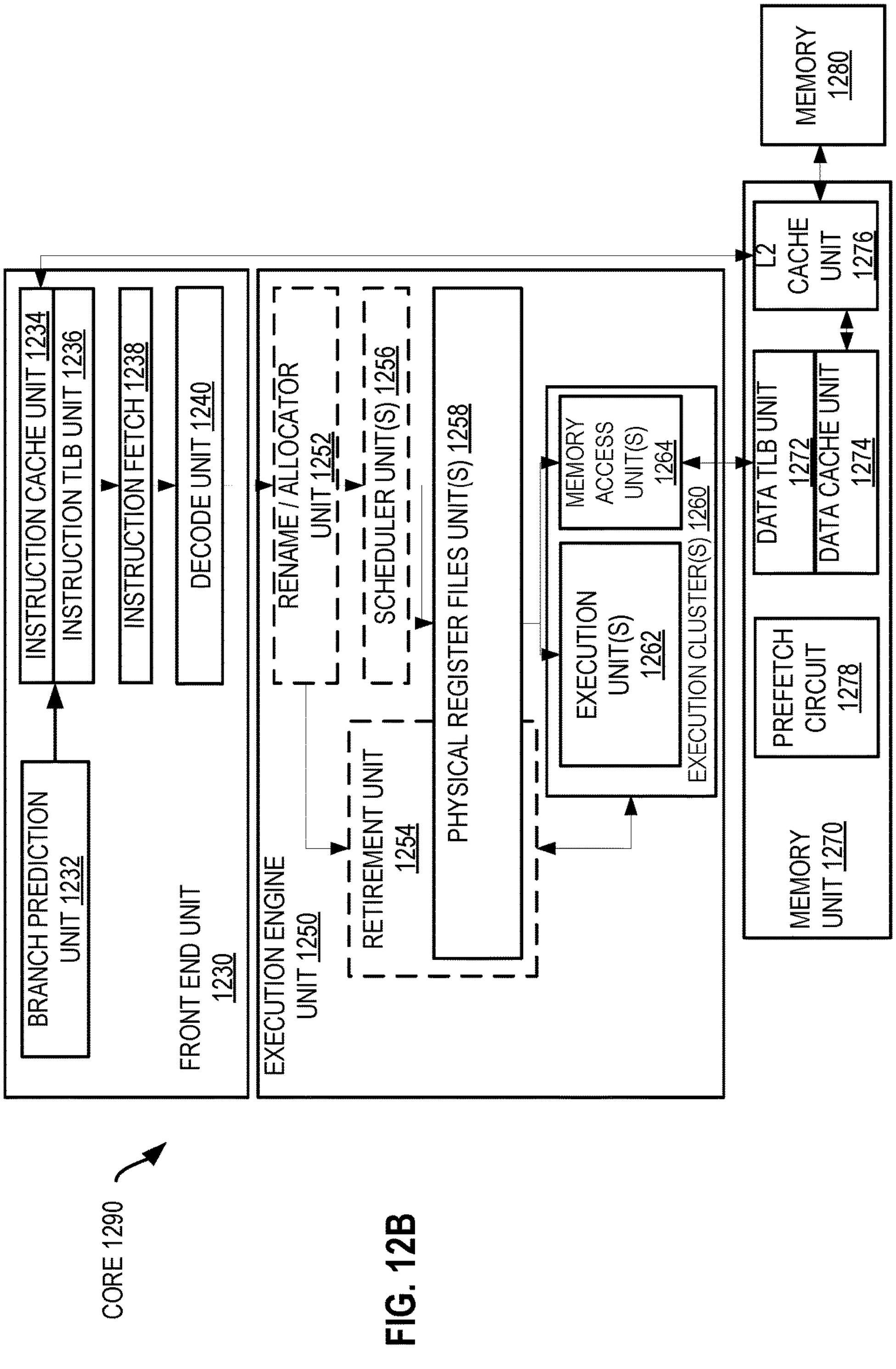

FIG. 12B

CIRCUITRY AND METHODS FOR IMPLEMENTING CAPABILITY-BASED COMPARTMENT SWITCHES WITH DESCRIPTORS

TECHNICAL FIELD

The disclosure relates generally to electronics, and, more specifically, an example of the disclosure relates to circuitry for implementing capability-based compartment switches with descriptors.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 9A is a block diagram illustrating a generic vector friendly instruction format and class A instruction templates thereof according to examples of the disclosure.

FIG. 9B is a block diagram illustrating the generic vector friendly instruction format and class B instruction templates thereof according to examples of the disclosure.

FIG. 10A is a block diagram illustrating fields for the generic vector friendly instruction formats in FIGS. 9A and 9B according to examples of the disclosure.

FIG. 10B is a block diagram illustrating the fields of the specific vector friendly instruction format in FIG. 10A that make up a full opcode field according to one example of the disclosure.

FIG. 10C is a block diagram illustrating the fields of the specific vector friendly instruction format in FIG. 10A that make up a register index field according to one example of the disclosure.

FIG. 10D is a block diagram illustrating the fields of the specific vector friendly instruction format in FIG. 10A that make up the augmentation operation field 950 according to one example of the disclosure.

FIG. 12A is a block diagram illustrating both an exemplary in-order pipeline and an exemplary register renaming, out-of-order issue/execution pipeline according to examples of the disclosure.

FIG. 12B is a block diagram illustrating both an exemplary example of an in-order architecture core and an exemplary register renaming, out-of-order issue/execution architecture core to be included in a processor according to examples of the disclosure.

DETAILED DESCRIPTION

Figure 1:
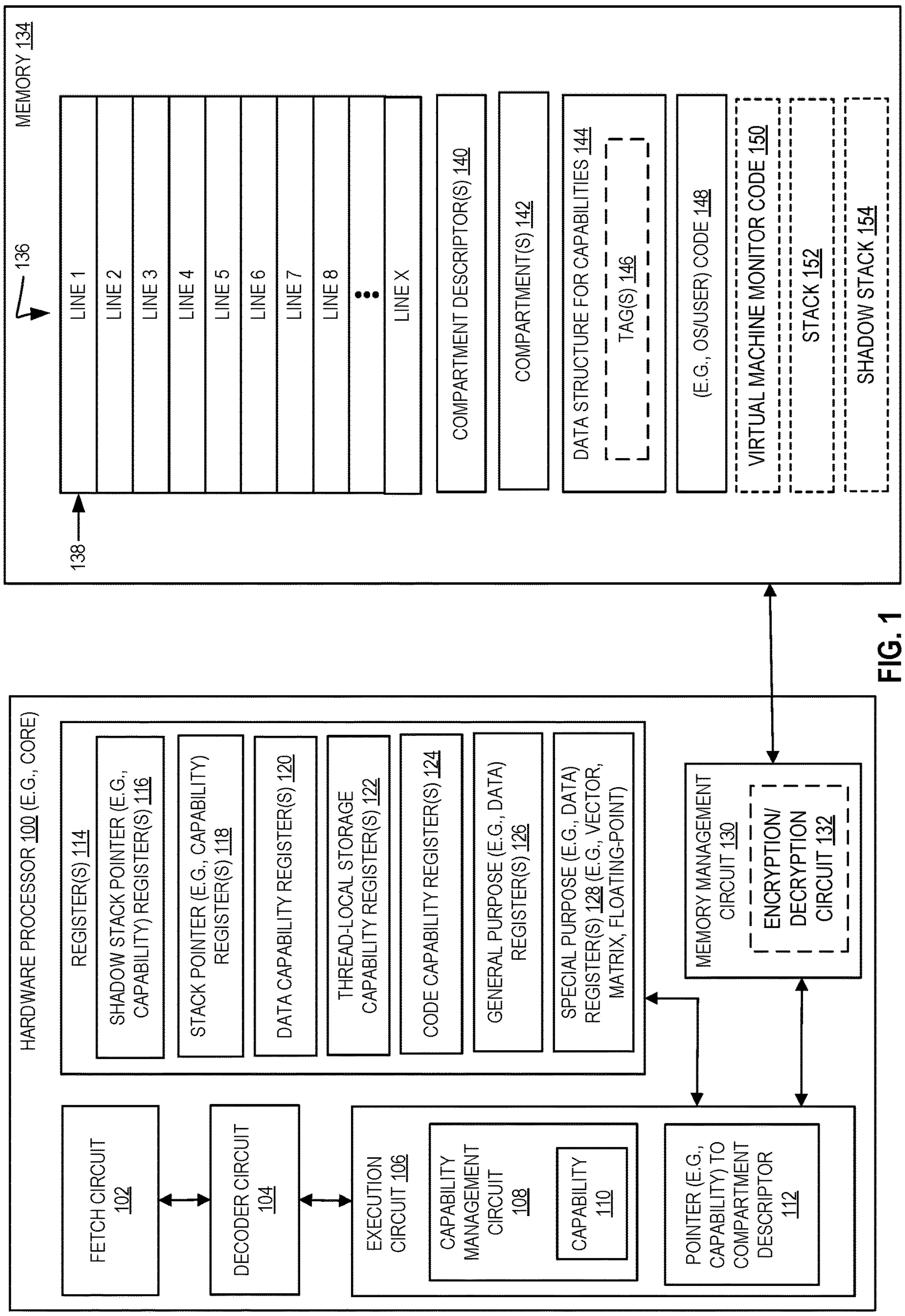
FIG. 1 illustrates a block diagram of a hardware processor including a capability management circuit and coupled to a memory having a plurality of compartments according to examples of the disclosure.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. In certain examples, a computer includes a hardware processor requesting access to (e.g., load or store) data and the memory is local (or remote) to the computer. A system may include a plurality of cores, for example, with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), for example, accessible according to a Peripheral Component Interconnect Express (PCIe) standard.

Memory may be divided into separate blocks (e.g., one or more cache lines), for example, with each block managed as a unit for coherence purposes. In certain examples, a (e.g., data) pointer (e.g., an address) is a value that refers to (e.g., points to) the location of data, for example, a pointer may be an (e.g., virtual) address and that data is (or is to be) stored at that address (e.g., at the corresponding physical address). In certain examples, memory is divided into multiple lines, e.g., and each line has its own (e.g., unique) address. For example, a line of memory may include storage for 512 bits, 256 bits, 128 bits, 64 bits, 32 bits, 16 bits, or 8 bits of data, or any other number of bits.

In certain examples, memory corruption (e.g., by an attacker) is caused by an out-of-bound access (e.g., memory access using the base address of a block of memory and an offset that exceeds the allocated size of the block) or by a dangling pointer (e.g., a pointer which referenced a block of memory (e.g., buffer) that has been de-allocated).

Certain examples herein utilize memory corruption detection (MCD) hardware and/or methods, for example, to prevent an out-of-bound access or an access with a dangling pointer. In certain examples, memory accesses are via a capability, e.g., instead of a pointer. In certain examples, the capability is a communicable (e.g., unforgeable) token of authority, e.g., through which programs access all memory and services within an address space. In certain examples, capabilities are a fundamental hardware type that are held in registers (e.g., where they can be inspected, manipulated, and dereferenced using capability instructions) or in memory (e.g., where their integrity is protected). In certain examples, the capability is a value that references an object along with an associated set of one or more access rights. In certain examples, a (e.g., user level) program on a capability-based operating system (OS) is to use a capability (e.g., provided to the program by the OS) to access a capability protected object.

In certain examples of a capability-based addressing scheme, (e.g., code and/or data) pointers are replaced by protected objects (e.g., "capabilities") that are created only through the use of privileged instructions, for example, which are executed only by either the kernel of the OS or some other privileged process authorized to do so, e.g., effectively allowing the kernel (e.g., supervisor level) to control which processes may access which objects in memory (e.g., without the need to use separate address spaces and therefore requiring a context switch for an access). Certain examples implement a capability-based addressing scheme by extending the data storage (for example, extending memory (e.g., and register) addressing) with an additional bit (e.g., writable only if permitted by the capability management circuit) that indicates that a particular location is a capability, for example, such that all memory accesses (e.g., loads, stores, and/or instruction fetches) must be authorized by a respective capability or be denied. Example formats of capabilities are discussed below in reference to FIGS. 2A and 2B.

Certain processors include a compartmentalization architecture, e.g., with a corresponding compartment identifier ("CID") for each compartment. In certain examples, the CID value is programmed into a specified (e.g., control) register of a processor core. In certain examples, a CID is a 16-bit identifier, although any number of bits may be used (e.g., 8 bits, 32 bits, 64 bits, etc.). In certain examples, the CID uniquely identifies a compartment, allowing (e.g., 64k) compartments to be allocated in a single process address space. In certain examples, all data accesses are tagged if compartmentalization is enabled and the tag for a data access must match the current (e.g., active) compartment identifier programmed in the (e.g., control) register of the processor (e.g., a portion of the tag must be the CID value).

In certain examples, each compartment includes multiple items (e.g., categories) of information, e.g., multiple state elements. In certain examples, each item of information within a single compartment (e.g., each state element within a single compartment) includes a respective capability (e.g., address and security metadata) to that stored information.

Figure 3:
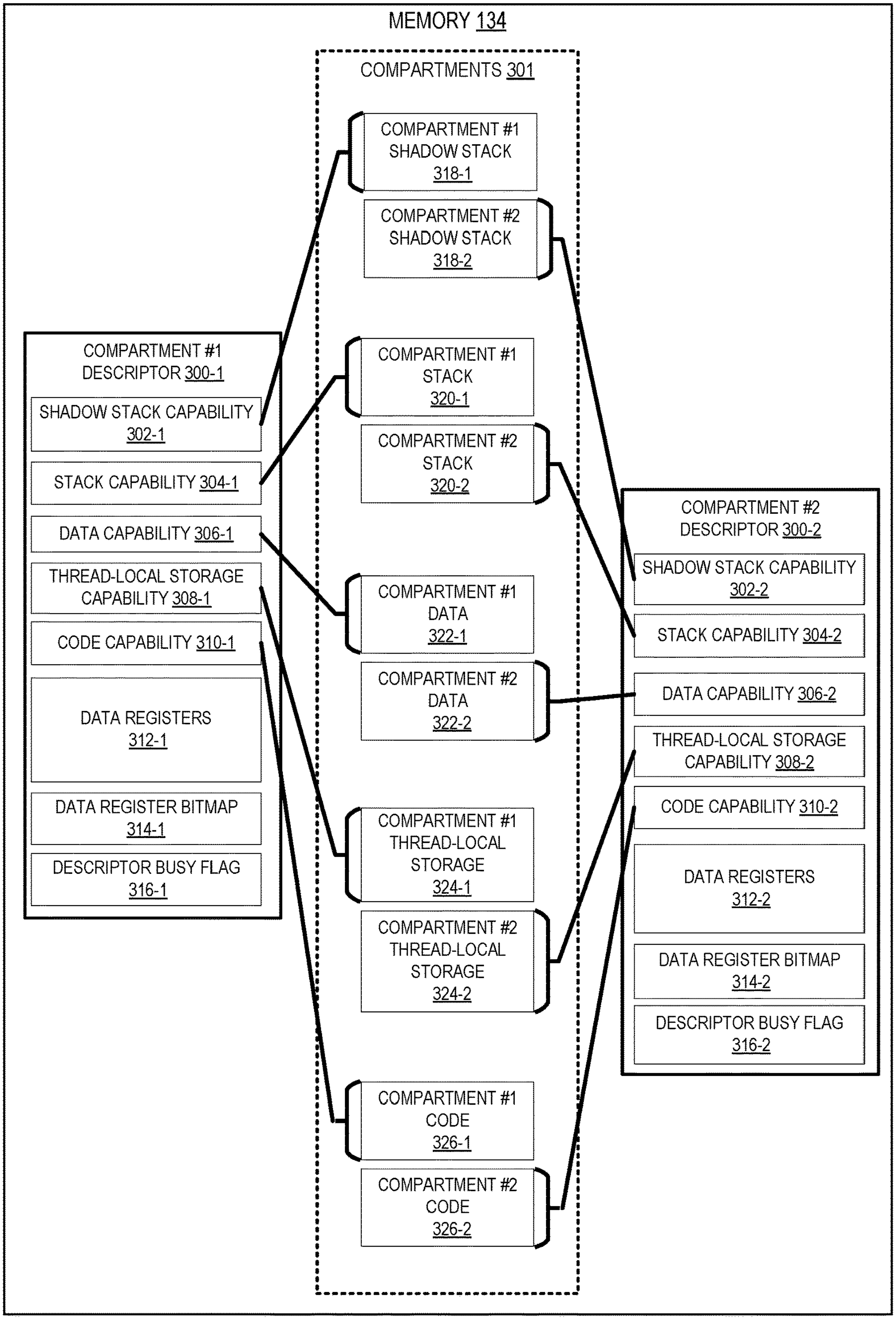
FIG. 3 illustrates a memory having a first compartment, a first compartment descriptor for the first compartment, a second compartment, and a second compartment descriptor for the second compartment according to examples of the disclosure.

In certain examples, each compartment has a respective compartment descriptor, for example, storing one or more capabilities for a corresponding one or more items of information stored within a single compartment (for example, with each item stored in a respective memory region of its compartment, e.g., as shown in FIG. 3). In certain examples, each compartment descriptor is stored in memory (e.g., and not in a register) and includes a pointer (or capability) to that compartment descriptor. Example formats of compartments and their respective compartment descriptors are discussed below in reference to FIG. 3.

In certain examples, utilizing a compartment includes switching from a first compartment (e.g., whose elements (e.g., state elements) are currently within and/or identified by the registers of a processor (e.g., core)) to a second compartment (e.g., whose elements are within memory and/or identified within memory and are to be loaded into the registers of the processor core).

However, in certain examples, switching compartments requires updating (e.g., saving and/or restoring) multiple "capability" types of registers (for example, and their corresponding metadata, see, e.g., FIGS. 2A-2B)), for example, one or more registers for each of: a default data region, a stack, code, thread-local storage, etc. In certain examples, switching compartments is to additionally update (e.g., save and/or restore) general purpose (e.g., data) registers and/or special purpose (e.g., data) registers, for example, floating-point registers, vector (e.g., Advanced Vector eXtension (AVX)) registers, two-dimensional matrix (e.g., Advanced Matrix eXtension (AMX)) registers, etc.

Examples herein are directed to (e.g., fast) capability-based compartment switches with descriptors. Examples herein are directed to instructions to perform (e.g., fast) capability-based compartment switches with descriptors. In certain examples, each descriptor is to store multiple capabilities referencing distinct regions of program memory, e.g., as well as data registers. Examples herein are directed to instructions to perform (e.g., fast) capability-based compartment switches of state elements of capability-based compartments.

In certain examples, updating each register using a plurality of distinct instructions is time consuming. Examples herein are directed to a single instruction that loads the corresponding registers with their state from a descriptor that describes a respective compartment, e.g., so that the entire register state of the compartment (e.g., and not just the process context) is restored using a single instruction. Examples herein are directed to a single instruction that stores capabilities to state elements (e.g., and data) from the corresponding registers into a descriptor for a respective compartment, e.g., so that the entire register state of the first compartment (e.g., and not just the process context) is saved and the entire register state of the second compartment (e.g., and not just the process context) is restored using a single instruction. Examples herein define an in-memory descriptor that contains capabilities for each memory region (e.g., data, stack, shadow stack, code, thread-local storage, etc.) as well as data register values that are to be saved and restored when switching between compartments. Examples herein define instructions to invoke those save and/or restore operations.

Certain examples herein include a capability management circuit to check a capability for a memory access request, the capability comprising an address field and a bounds field that is to indicate a lower bound and an upper bound of an address range to which the capability authorizes access.

Certain examples herein are directed to a single instruction comprising one or more fields to indicate a first compartment descriptor that identifies a first capability to a first state element in a first compartment of memory and a second capability to a second state element in the first compartment of the memory, and an opcode to indicate that an execution circuit is to load the first capability from the first compartment descriptor into a first register to enable the capability management circuit to determine whether a first bounds field of the first capability authorizes an (e.g., attempted) (e.g., subsequent) access(es) to the first state element in the first compartment of the memory, and load the second capability from the first compartment of the memory into a second register to enable the capability management circuit to determine whether a second bounds field of the second capability authorizes an (e.g., attempted) (e.g., subsequent) access(es) to the second state element in the first compartment of the memory. In certain examples, corresponding bounds are also checked for a capability used to reference the compartment descriptor (e.g., as opposed to the compartment itself that is composed of the various state elements), e.g., prior to loading the capabilities within that descriptor for those state elements. In certain examples, the bounds from the capabilities for the individual state elements are checked when subsequent accesses are performed on the individual state elements via the registers into which the capabilities for each state element have been loaded (e.g., the bounds from the shadow stack capability are checked when a shadow stack access is performed). These examples are improvements to the functioning of a processor (e.g., of a computer) itself because they allow the loading of the first capability indicated by the first compartment descriptor into the first register and the second capability indicated by the first compartment descriptor into the second register for the first compartment of memory that is protected by the first capability and the second capability, e.g., and thus, without causing a need for calling multiple instructions. The instructions disclosed herein are improvements to the functioning of a processor (e.g., of a computer) itself because they implement the above functionality by electrically changing a general-purpose computer (e.g., the decoder circuit and/or the execution circuit thereof) by creating electrical paths within the computer (e.g., within the decoder circuit and/or the execution circuit thereof). These electrical paths create a special purpose machine for carrying out the particular functionality.

Certain examples herein are directed to a single instruction wherein the one or more fields of the single instruction indicate a second compartment descriptor that identifies a third capability to a third state element in a second compartment of the memory and a fourth capability to a fourth state element in the second compartment of the memory, and the opcode is to further indicate that the execution circuit is to, before the loads, store the third capability from the first register into the second compartment descriptor, and store the fourth capability from the second register into the second compartment descriptor of the memory. These examples are improvements to the functioning of a processor (e.g., of a computer) itself because they allow the storing of the third state element from the first register and the fourth state element from the second register into the second compartment descriptor, e.g., and thus, without causing a need for calling multiple instructions. The instructions disclosed herein are improvements to the functioning of a processor (e.g., of a computer) itself because they implement the above functionality by electrically changing a general-purpose computer (e.g., the decoder circuit and/or the execution circuit thereof) by creating electrical paths within the computer (e.g., within the decoder circuit and/or the execution circuit thereof). These electrical paths create a special purpose machine for carrying out the particular functionality.

Certain examples herein are directed to a single instruction comprising one or more fields to indicate a location of the first compartment descriptor in the memory to store the first capability to the first state element in the first compartment of the memory and the second capability to the second state element in the first compartment of the memory, and an opcode to indicate that the execution circuit is to initialize the memory at the location in a format of a compartment descriptor with space for the first capability and the second capability. These examples are improvements to the functioning of a processor (e.g., of a computer) itself because they allow for the initialization of the memory at the location in a format of a compartment descriptor with space for the first capability and the second capability. The instructions disclosed herein are improvements to the functioning of a processor (e.g., of a computer) itself because they implement the above functionality by electrically changing a general-purpose computer (e.g., the decoder circuit and/or the execution circuit thereof) by creating electrical paths within the computer (e.g., within the decoder circuit and/or the execution circuit thereof). These electrical paths create a special purpose machine for carrying out the particular functionality.

The instructions disclosed herein are improvements to the functioning of a processor (e.g., of a computer) itself. Instruction decode circuitry (e.g., decoder circuit 104) not having such an instruction as a part of its instruction set would not decode as discussed herein. An execution circuit (e.g., execution circuit 106) not having such an instruction as a part of its instruction set would not execute as discussed herein. For example, a switch compartment instruction and/or an initialize compartment instruction. Examples herein are improvements to the functioning of a processor (e.g., of a computer) itself as they provide enhanced security (e.g., security hardening).

In certain examples, instructions herein are not XSAVE instructions, e.g., are not merely instruction that save a processor's extended states.

Certain (e.g., 64-bit or greater mode) instructions herein save and/or load capabilities to state elements that are not only data elements, e.g., not only values from data registers and/or control registers. Certain instructions herein are user level instructions (e.g., accessible in user space) to save and/or load capabilities to state elements (for example, state elements that are not only data elements, e.g., not only values from data registers and/or control registers). Certain instructions herein utilize a compartment descriptor to save and/or load capabilities to state elements (for example, state elements that are not only data elements, e.g., not only values from data registers and/or control registers). Certain instructions herein utilize a compartment descriptor and its busy flag to save and/or load capabilities to state elements (for example, state elements that are not only data elements, e.g., not only values from data registers and/or control registers) from a compartment, e.g., of multiple compartments that share an address space. Certain instructions herein implement a consistency (e.g., security) check in the saving and/or loading of capabilities to state elements (for example, state elements that are not only data elements, e.g., not only values from data registers and/or control registers). Certain instructions herein implement a capability check in the saving and/or loading of capabilities to state elements (for example, state elements that are not only data elements, e.g., not only values from data registers and/or control registers).

In certain examples, instructions herein are not (e.g., 32-bit mode) Task-State Segment (TSS) instructions, e.g., are not merely instructions that save state information, needed to restore a task, in distinct units (e.g., a system segment) of software. In certain examples, instructions herein save capabilities to state element(s) in addition to (or alternatively to) saving the state from: general-purpose register(s) (e.g., the state stored in the EAX, ECX, EDX, EBX, ESP, EBP, ESI, and EDI registers), segment selector register(s) (e.g., the state stored in the ES, CS, SS, DS, FS, and GS registers), flags register(s) (e.g., the state stored in the EFLAGS register), and/or instruction pointer register(s) (e.g., the state stored in the EIP register).

Certain examples use "sealed capabilities" that permit a data region to be give a "type" such that it can only be accessed by code with the same type. However, in certain of these examples, sealed capabilities only update code and data capability registers, whereas many other registers may need to be updated as described herein. Furthermore, in certain of these examples, the runtime still needs to load the contents of the code and data capability registers separately prior to entering the compartment defined using those capabilities. Certain examples herein are directed to instructions that overcome these problems, e.g., instructions that update other registers besides code and data capability registers.

Turning now to the Figures, FIG. 1 illustrates a block diagram of a hardware processor 100 (e.g., core) including a capability management circuit 108 and coupled to a memory 134 having a plurality of compartments 142 according to examples of the disclosure. Although the capability management circuit 108 is depicted within the execution circuit 106, it should be understood that the capability management circuit can be located elsewhere, for example, in another component of hardware processor 100 (e.g., within fetch circuit 102) or separate from the depicted components of hardware processor 100.

Depicted hardware processor 100 includes a hardware fetch circuit 102 to fetch an instruction (e.g., from memory 134), e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134. Depicted hardware processor 100 includes a hardware decoder circuit 104 to decode an instruction, e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134. Depicted hardware execution circuit 106 is to execute the decoded instruction, e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134.

In certain examples, an instruction utilizes a compartment descriptor 140, e.g., storing in memory 134 the pointers and/or capabilities to the multiple items (e.g., categories) of information, e.g., multiple state elements, in a corresponding compartment 142. This is discussed further in reference to FIG. 3.

In certain examples, an instruction utilizes (e.g., takes as an operand) a pointer 112 to the address where a particular compartment descriptor 140 is stored, e.g., with the compartment descriptor including one or more (e.g., a plurality of) pointers and/or capabilities to the corresponding items (e.g., state elements) stored in its compartment 142. In certain examples, an instruction utilizes (e.g., takes as an operand) a capability 112 (e.g., an address and security metadata) to the address where a particular compartment descriptor 140 is stored, e.g., with the compartment descriptor including one or more (e.g., a plurality of) pointers and/or capabilities to the corresponding items (e.g., state elements) stored in its compartment 142.

In certain examples, capability management circuit 108 is to, in response to receiving an instruction that is requested for fetch, decode, and/or execution, check if the instruction is a capability instruction or a non-capability instruction (e.g., a capability-unaware instruction), for example, and (i) if a capability instruction, is to allow access to memory 134 storing a capability (e.g., a capability in a global variable referencing a heap object) and/or (ii) if a non-capability instruction, is not to allow access to memory 134 storing (1) a capability (e.g., in a compartment descriptor 140) and/or (2) state, data, and/or instructions (e.g., an object) protected by a capability (e.g., in a compartment 142). In certain examples, capability management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular register is a "capability" type of register (e.g., instead of a general-purpose data register) (e.g., implying that certain register(s) are not to be used to store a capability or capabilities). In certain examples, capability management circuit 108 is to manage the capabilities, e.g., only the capability management circuit is to set and/or clear validity tags (e.g., in memory and/or in register(s)). In certain examples, capability management circuit 108 is to clear the validity tag of a capability in a register in response to that register being written to by a non-capability instruction. In certain examples, a capability management circuit does not permit separate access by capability instructions to individual capabilities within a compartment descriptor. In certain examples, a compartment descriptor has a predetermined format with particular locations for capabilities, which renders a set of explicit validity tag bits unnecessary, e.g., in contrast to a general capability instruction that will check explicit validity tag bits. In certain examples, a capability instruction is not needed to use a capability to access non-capability data, e.g., the capability instruction is used to update, initialize, or perform some other restricted operation on a capability.

Capabilities Stored in Memory

In certain examples, the source storage location (e.g., virtual address) for a capability 110 in memory 134 (e.g., in a compartment descriptor 140) is an operand of an instruction (e.g., microcode or micro-instruction) (e.g., having a mnemonic of LoadCap) that is to load the capability from the memory 134 (e.g., from the compartment descriptor 140) into register(s) 114. In certain examples, the destination storage location (e.g., virtual address) for capability 110 in memory 134 (e.g., in a compartment descriptor 140) is an operand of an (e.g., user or supervisor level) instruction (e.g., microcode or micro-instruction) (e.g., having a mnemonic of StoreCap) that is to store the capability from the register(s) 114 into memory 134 (e.g., into compartment descriptor 140).

In certain examples, the compartment descriptor is identified by a pointer. In certain examples, the compartment descriptor (e.g., storing one or more capabilities in it) is identified by its own capability, and thus protected by that capability (e.g., separate from the one or more capabilities stored in the compartment descriptor).

Information (e.g., State, Data, and/or Instructions) Stored in Memory (e.g., a Compartment of the Memory) and Protected by a Capability In certain examples, the source storage location (e.g., virtual address) in memory 134 (e.g., in a compartment 142) for state, data, and/or instructions (e.g., an object) protected by the bounds of a "capability with bounds" 110 is an operand of an (e.g., supervisor level or user level) instruction (e.g., microcode or micro-instruction) (e.g., having a mnemonic of LoadData) that is to load the state, data, and/or instructions (e.g., an object) protected by those bounds from the memory 134 (e.g., from a compartment 142) into register(s) 114. In certain examples, the destination storage location (e.g., virtual address) in memory 134 (e.g., in a compartment 142) for state, data, and/or instructions (e.g., an object) to-be-protected by the bounds of a "capability with bounds" 110 is an operand of an (e.g., supervisor level or user level) instruction (e.g., microcode or micro-instruction) (e.g., having a mnemonic of StoreData) that is to store the state, data, and/or instructions (e.g., an object) protected by those bounds from the register(s) 114 into memory 134 (e.g., into a compartment 142). In certain examples, the instruction is requested for execution by executing user code and/or OS code 148 (e.g., or some other privileged process authorized to do so). In certain examples, an instruction set architecture (ISA) includes one or more instructions for manipulating the bounds field, e.g., to set the lower bound and/or upper bound of an object.

In certain examples, the source storage location (e.g., virtual address) in memory 134 (e.g., in a compartment 142) for state, data, and/or instructions (e.g., an object) protected by the metadata and/or bounds of the "capability with metadata and/or bounds" 110 is an operand of an (e.g., supervisor level or user level) instruction (e.g., microcode or micro-instruction) (e.g., having a mnemonic of LoadData) that is to load the state, data, and/or instructions (e.g., an object) protected by the metadata and/or bounds from the memory 134 (e.g., from a compartment 142) into register(s) 114. In certain examples, the destination storage location (e.g., virtual address) in memory 134 (e.g., in a compartment 142) for state, data, and/or instructions (e.g., an object) to-be-protected by the metadata and/or bounds of the "capability with metadata and/or bounds" 110 is an operand of an (e.g., supervisor level or user level) instruction (e.g., microcode or micro-instruction) (e.g., having a mnemonic of StoreData) that is to store the state, data, and/or instructions (e.g., an object) protected by the metadata and/or bounds from the register(s) 114 into memory 134 (e.g., into a compartment 142). In certain examples, the instruction is requested for execution by executing user code and/or OS code 148 (e.g., or some other privileged process authorized to do so). In certain examples, an instruction set architecture (ISA) includes one or more instructions for manipulating the capability field(s) (e.g., the fields in FIGS. 2A-2B), e.g., to set the metadata and/or bound(s) of an object in memory.

In certain examples, capability management circuit 108 is to enforce security properties on changes to capability data (e.g., metadata), for example, for the execution of a single instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability manipulation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, capability management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy" problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a capability management circuit 108 provide the foundation on which a capability-based OS, compiler, and runtime can implement a certain programming language (e.g., C and/or C++) language memory safety and compartmentalization.

In certain examples, the capability is stored in a single line of data. In certain examples, the capability is stored in multiple lines of data. For example, a block of memory may be lines 1 and 2 of data of the (e.g., physical) addressable memory 136 of memory 134 having an address 138 to one (e.g., the first) line (e.g., line 1). Certain examples have a memory of a total size X, where X is any positive integer. Although the addressable memory 136 is shown separate from certain regions (e.g., compartment descriptor(s) 140 and compartments 142), it should be understood that those regions (e.g., compartment descriptor(s) 140 and compartments 142) may be within addressable memory 136.

In certain examples, capabilities (e.g., one or more fields thereof) themselves are also stored in memory 134, for example, in data structure 144 (e.g., table) for capabilities. In certain examples, a (e.g., validity) tag 146 is stored in data structure 144 for a capability stored in memory. In certain examples, tags 146 (e.g., in data structure 144) are not accessible by non-capability (e.g., load and/or store) instructions. In certain examples, a (e.g., validity) tag is stored along with the capability stored in memory (e.g., in one contiguous block). In certain examples, capabilities are stored in compartment descriptors 140, e.g., with a compartment descriptor indicated (e.g., identified) by a pointer (or capability) 112 to that compartment descriptor.

Depicted hardware processor 100 includes one or more registers 114, for example, one or any combination (e.g., all of): shadow stack pointer (e.g., capability) register(s) 116, stack pointer (e.g., capability) register(s) 118, data capability register(s) 120, thread-local storage capability register(s) 122, code capability register(s) 124, general purpose (e.g., data) register(s) 126, or special purpose (e.g., data) register(s) 128. In certain examples, a user is allowed access to only a proper subset (e.g., not all) of registers 114.

In certain examples, memory 134 includes a stack 152 (e.g., and a shadow stack 154). A stack may be used to push (e.g., load data onto the stack) and/or pop (e.g., remove or pull data from the stack). In one example, a stack is a last in, first out (LIFO) data structure. As examples, a stack may be a call stack, data stack, or a call and data stack. In one example, a context for a first thread may be pushed and/or popped from a stack. For example, a context for a first thread may be pushed to a stack when switching to a second thread (e.g., and its context). Context (e.g., context data) sent to the stack may include (e.g., local) variables and/or bookkeeping data for a thread. A stack pointer (e.g., stored in a stack pointer register 118) may be incremented or decremented to point to a desired element of the stack.

In certain examples, a shadow stack 154 is used, for example, in addition to a (e.g., separate) stack 152 (e.g., as discussed herein). In one example, the term shadow stack may generally refer to a stack to store control information, e.g., information that can affect program control flow or transfer (e.g., return addresses and (e.g., non-capability) data values). In one example, a shadow stack 154 stores control information (e.g., pointer(s) or other address(es)) for a thread, for example, and a (e.g., data) stack may store other data, for example, (e.g., local) variables and/or bookkeeping data for a thread.

In certain examples, one or more shadow stacks 154 are included and used to protect an apparatus and/or method from tampering and/or increase security. The shadow stack(s) (e.g., shadow stack 154 in FIG. 1) may represent one or more additional stack type of data structures that are separate from the stack (e.g., stack 152 in FIG. 1). In one example, the shadow stack (or shadow stacks) is used to store control information but not data (e.g., not parameters and other data of the type stored on the stack, e.g., that user-level application programs are to write and/or modify). In one example, the control information stored on the shadow stack (or stacks) is return address related information (e.g., actual return address, information to validate return address, and/or other return address information). In one example, the shadow stack is used to store a copy of each return address for a thread, e.g., a return address corresponding to a thread whose context or other data has been previously pushed on the (e.g., data) stack. For example, when functions or procedures have been called, a copy of a return address for the caller may have been pushed onto the shadow stack. The return information may be a shadow stack pointer (SSP), e.g., that identifies the most recent element (e.g., top) of the shadow stack. In certain examples, the shadow stack may be read and/or written to in user level mode (for example, current privilege level (CPL) equal to three, e.g., a lowest level of privilege) or in a supervisor privilege level mode (for example, a current privilege level (CPL) less than three, e.g., a higher level of privilege than CPL=3). In one example, multiple shadow stacks may be included, but only one shadow stack (e.g., per logical processor) at a time may be allowed to be the current shadow stack. In certain examples, there is a (e.g., one) register of the processor to store the (e.g., current) shadow stack pointer.

In certain examples, the shadow stack (e.g., capability) register 116 stores a capability (e.g., a pointer with security metadata) that indicates the (e.g., address of the) corresponding element in (e.g., the top of) the shadow stack 154 in memory 134. In certain examples, the stack register 118 stores a capability (e.g., a pointer with security metadata) that indicates the (e.g., address of the) corresponding element in (e.g., the top of) the stack 152 in memory 134.

In certain examples, the data capability register(s) 120 stores a capability (e.g., a pointer with security metadata) that indicates the (e.g., address of the) corresponding data in memory 134 (e.g., data that is protected by the capability).

In certain examples, the thread-local storage capability register(s) 122 stores a capability (e.g., a pointer with security metadata) that indicates the (e.g., address of the) corresponding thread-local storage in memory 134 (e.g., thread-local storage that is protected by the capability). In certain examples, thread-local storage (TLS) is a mechanism by which variables are allocated such that there is one instance of the variable per extant thread, e.g., using static or global memory local to a thread.

In certain examples, the code capability register(s) 124 stores a capability (e.g., a pointer with security metadata) that indicates the (e.g., address of the) corresponding code (e.g., block of instructions) in memory 134 (e.g., code that is protected by the capability).

In certain examples, the general purpose (e.g., data) register(s) 126 are to store values (e.g., data). In certain examples, the general purpose (e.g., data) register(s) 126 are not protected by a capability (e.g., but they can be used to store a capability). In certain examples, general purpose (e.g., data) register(s) 126 (e.g., 64-bits wide) includes registers RAX, RBX, RCX, RDX, RBP, RSI, RDI, RSP, and R8 through R15.

In certain examples, the special purpose (e.g., data) register(s) 128 are to store values (e.g., data). In certain examples, the special purpose (e.g., data) register(s) 128 are not protected by a capability (e.g., but they may in some examples be used to store a capability). In certain examples, special purpose (e.g., data) register(s) 128 include one or any combination of floating-point data registers (e.g., to store floating-point formatted data), vector (e.g., Advanced Vector eXtension (AVX)) registers, two-dimensional matrix (e.g., Advanced Matrix eXtension (AMX)) registers, etc.

In certain examples, register(s) 114 includes register(s) dedicated only for capabilities, e.g., registers CAX, CBX, CCX, CDX, etc.).

Hardware processor 100 includes a coupling (e.g., connection) to memory 134. In certain examples, memory 134 is a memory local to the hardware processor (e.g., system memory). In certain examples, memory 134 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

Hardware processor 100 includes a memory management circuit 130, for example, to control access (e.g., by the execution unit 106) to the (e.g., addressable memory 136 of) memory 134. Hardware processor 100 (e.g., memory management circuit 130) may include an encryption/decryption circuit 132, for example, the encrypt or decrypt data for memory 134.

Memory 134 may include virtual machine monitor code 150. In certain examples of computing, a virtual machine (VM) is an emulation of a computer system. In certain examples, VMs are based on a specific computer architecture and provide the functionality of an underlying physical computer system. Their implementations may involve specialized hardware, firmware, software, or a combination. In certain examples, the virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (I/O) resources, such as, but not limited to, memory management circuit 130. The VMM may provide a centralized interface for managing the entire operation, status, and availability of VMs that are installed over a single host machine or spread across different and interconnected hosts.

Certain examples herein utilize a compartment descriptor 140 containing capabilities that point to one or more state elements (e.g., and data and/or instructions) in its respective compartment 142. In certain examples, hardware processor 100 uses a compartmentalization architecture, e.g., with a corresponding compartment identifier ("CID") for each compartment 142. In certain examples, the CID value is programmed into a specified (e.g., control) register of a processor core. In certain examples, a CID is a 16-bit identifier, although any number of bits may be used (e.g., 8 bits, 32 bits, 64 bits, etc.). In certain examples, the CID uniquely identifies a compartment 142, allowing (e.g., 64k) compartments 142 to be allocated in a single process address space of addressable memory 136. In certain examples, all accesses are tagged if compartmentalization is enabled and the tag for an access must match the current (e.g., active) compartment identifier programmed in the (e.g., control) register of the register(s) 114 of the processor (e.g., a portion of the tag must be the CID value).

In certain examples, each compartment 142 includes multiple items (e.g., categories) of information, e.g., multiple state elements. In certain examples, each item of information within a single compartment 142, e.g., each state element within a single compartment 142, includes a respective capability (e.g., address and security metadata) to that stored information.

In certain examples, each compartment 142 has a respective compartment descriptor 140, for example, storing one or more capabilities for a corresponding one or more items of information stored within a single compartment 142. In certain examples, each compartment descriptor 140 is stored in memory (e.g., not in a register or in a register) and includes a pointer 112 (or capability) to that compartment descriptor 140. Example formats of compartments and their respective compartment descriptors are discussed below in reference to FIG. 3.

In certain examples, utilizing a compartment includes switching from a first compartment (whose elements (e.g., state elements) are within or identified by the registers 114 of a processor 100 (e.g., core)) to a second compartment (e.g., whose elements are within memory 134 or are identified with memory 134 and are to be loaded into the registers 114 of the processor 100 (e.g., core)).

In certain examples, an instruction is to load a capability, store a capability, and/or switch between capabilities (e.g., switch an active first capability to being inactive and switch an inactive second capability to being active) in the hardware processor 100, e.g., via capability management circuit 108 using capability-based access control for enforcing memory safety, e.g., and low-overhead compartmentalization. In certain examples, hardware processor 100 (e.g., the decoder circuit 104 and/or the execution circuit 106 thereof) executes a single instruction to (i) save capabilities to elements (e.g., including state elements) from registers 114 (e.g., the content of any one or combination of the registers 114) into a compartment descriptor 140 for a compartment 142 thereof and/or (ii) load capabilities to elements (e.g., including state elements) from a compartment descriptor 140 for a compartment 142 into registers 114 (e.g., any one or combination of the registers 114). In certain examples, the elements include state elements, data elements, and/or code elements. In certain examples, the elements are identified by a respective capability, e.g., stored in a corresponding compartment descriptor 140.

In certain examples, hardware processor 100 (e.g., the decoder circuit 104 and/or the execution circuit 106 thereof) execute a single user level instruction (e.g., accessible in user space) to save and/or load capabilities to state elements (for example, state elements that are not only data elements, e.g., not only values from data registers and/or control registers). Certain instructions herein utilize a compartment descriptor 140 to save and/or load capabilities to state elements (for example, state elements that are not only data elements, e.g., not only values from data registers and/or control registers). Certain instructions herein utilize a compartment descriptor 140 and its busy flag (e.g., as shown in FIG. 3) to save and/or load capabilities to state elements (for example, state elements that are not only data elements, e.g., not only values from data registers and/or control registers) in/from a compartment, e.g., of multiple compartments that share an address space. Certain instructions herein implement a consistency (e.g., security) check by capability management circuit 108 in the saving and/or loading of capabilities to state elements (for example, state elements that are not only data elements, e.g., not only values from data registers and/or control registers). Certain instructions herein implement a capability check by capability management circuit 108 in the saving and/or loading of capabilities to state elements (for example, state elements that are not only data elements, e.g., not only values from data registers and/or control registers).

A capability may have different formats and/or fields. In certain examples, a capability is more than twice the width of a native (e.g., integer) pointer type of the baseline architecture, for example, 128-bit or 129-bit capabilities on 64-bit platforms, and 64-bit or 65-bit capabilities on 32-bit platforms. In certain examples, each capability includes an (e.g., integer) address of the natural size for the architecture (e.g., 32 or 64 bit) and additional metadata (e.g., that is compressed in order to fit) in the remaining (e.g., 32 or 64) bits of the capability. In certain examples, each capability includes (or is associated with) a (e.g., 1-bit) validity "tag" whose value is maintained in registers and memory (e.g., in tags 146) by the architecture (e.g., by capability management circuit 108). In certain examples, each element of the capability contributes to the protection model and is enforced by hardware (e.g., capability management circuit 108).

In certain examples, when stored in memory, valid capabilities are to be naturally aligned (e.g., at 64-bit or 128-bit boundaries) depending on capability size where that is the granularity at which in-memory tags are maintained. In certain examples, partial or complete overwrites with data, rather than a complete overwrite with a valid capability, lead to the in-memory tag being cleared, preventing corrupted capabilities from later being dereferenced. In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

Figure 2A:
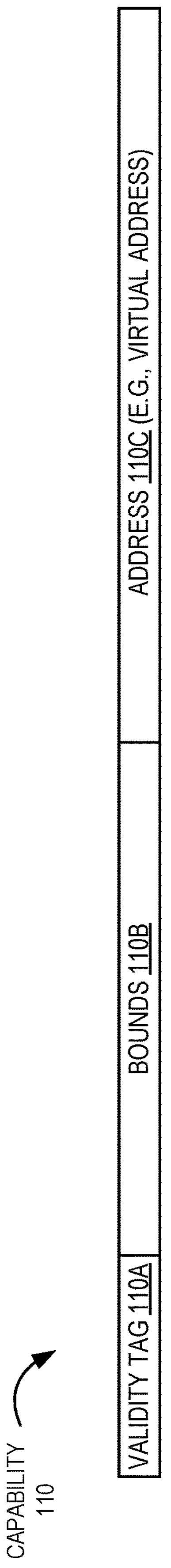
FIG. 2A illustrates an example format of a capability including a validity tag field, a bounds field, and an address field according to examples of the disclosure.

FIG. 2A illustrates an example format of a capability 110 including a validity tag 110A field, a bounds 110B field, and an address 110C (e.g., virtual address) field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object).

In certain examples, the validity tag 110A provides integrity protection, the bounds 110B limits how the value can be used (e.g., for example, for memory access), and/or the address 110C is the memory address storing the corresponding data (or instructions) protected by the capability.

Figure 2B:
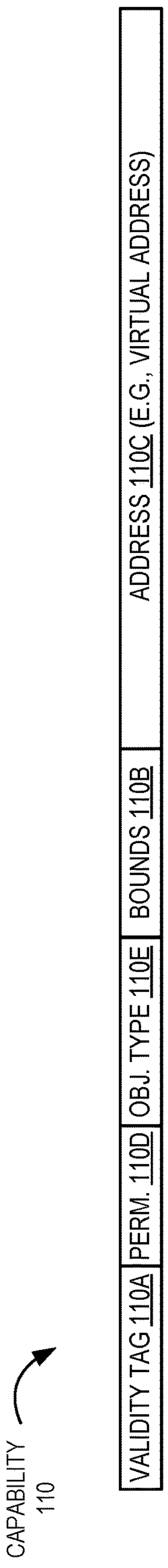
FIG. 2B illustrates an example format of a capability including a validity tag field, a permission field, an object type field, a bounds field, and an address field according to examples of the disclosure.

FIG. 2B illustrates an example format of a capability 110 including a validity tag 110A field, a permission(s) 110D field, an object type 110E field, a bounds 110B field, and an address 110C field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space (e.g., the range) to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capabilities can be used to implement opaque pointer types, e.g., such that controlled non-monotonicity can be used to support fine-grained, in-address-space compartmentalization.

In certain examples, permissions 110D include one or more of the following: "Load" to allow a load from memory protected by the capability, "Store" to allow a store to memory protected by the capability, "Execute" to allow execution of instructions protected by the capability, "LoadCap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

In certain examples, a capability is an individually revocable capability (IRC). In certain examples, each address space has capability tables for storing a capability associated with each memory allocation, and each pointer to that allocation contains a field (e.g., table index) referencing the corresponding table entry (e.g., a tag in that entry). In certain embodiments, IRC deterministically mitigates spatial vulnerabilities.

In certain examples, a compartment descriptor format for a capability (CAP) includes one or more of: (i) a capability table (CAP_TAB) address, (ii) CAP_CURSOR capability table entry index, (iii) default data capability (DDC) capability table entry index, (iv) current code capability (CCC) capability table entry index, (v) instruction pointer (e.g., RIP), (vi) stack pointer (e.g., RSP), and/or (vii) busy flag to block re-entry into an active compartment.

In certain examples, the format of a capability (for example, as a pointer that has been extended with security metadata, e.g., bounds, permissions, and/or type information) overflows the available bits in a pointer (e.g., 64-bit) format. In certain examples, to support storing capabilities in a general-purpose register file without expanding the registers, examples herein logically combine multiple registers (e.g., four for a 256-bit capability) so that the capability can be split across those multiple underlying registers, e.g., such that general purpose registers of a narrower size can be utilized with the wider format of a capability as compared to a (e.g., narrower sized) pointer.

FIG. 3 illustrates a memory 134 having a first compartment "−1" in compartments 301, a first compartment descriptor 300-1 for the first compartment, a second compartment "−2" in compartments 301, and a second compartment descriptor 300-2 for the second compartment according to examples of the disclosure.

In certain examples, compartments 301 is an instance of compartments 142 in FIG. 1. In certain examples, compartment descriptors 300-1 and 300-2 are instances of a compartment descriptor 140 in FIG. 1.

In FIG. 3, first compartment "-1" in compartments 301 is logically separate from the second (or other) compartments, e.g., such that the first compartment is not accessible by the second (or other) compartments and the second compartment is not accessible by the first (or other) compartments.

First compartment descriptor 300-1 includes any one or combination of: (i) shadow stack capability 302-1 that indicates (e.g., points to) the shadow stack element(s) 318-1 stored in the first compartment (e.g., with the shadow stack element(s) being those elements to and/or from the shadow stack pointer (e.g., capability) register(s) 116 in FIG. 1), (ii) stack capability 304-1 that indicates (e.g., points to) the stack element(s) 320-1 stored in the first compartment (e.g., with the stack element(s) being those elements to and/or from the stack pointer (e.g., capability) register(s) 118 in FIG. 1), (iii) data capability 306-1 that indicates (e.g., points to) the data element(s) 322-1 stored in the first compartment (e.g., with the data element(s) being those elements to and/or from the data capability register(s) 120 in FIG. 1), (iv) thread-local storage capability 308-1 that indicates (e.g., points to) the thread-local storage element(s) 324-1 stored in the first compartment (e.g., with the thread-local storage element(s) being those elements to and/or from the thread-local storage capability register(s) 122 in FIG. 1), (v) code capability 310-1 that indicates (e.g., points to) the code element(s) 326-1 stored in the first compartment (e.g., with the code element(s) being those elements to and/or from the code capability register(s) 124 in FIG. 1), or (vi) data registers 312-1 that stores the data element(s) from the register(s) for that compartment (e.g., with the data element(s) being those elements to and/or from the general purpose (e.g., data) register(s) 126 and/or special purpose (e.g., data) register(s) 128 in FIG. 1).

Second compartment descriptor 300-2 includes any one or combination of: (i) shadow stack capability 302-2 that indicates (e.g., points to) the shadow stack element(s) 318-2 stored in the second compartment (e.g., with the shadow stack element(s) being those elements to and/or from the shadow stack pointer (e.g., capability) register(s) 116 in FIG. 1), (ii) stack capability 304-2 that indicates (e.g., points to) the stack element(s) 320-2 stored in the second compartment (e.g., with the stack element(s) being those elements to and/or from the stack pointer (e.g., capability) register(s) 118 in FIG. 1), (iii) data capability 306-2 that indicates (e.g., points to) the data element(s) 322-2 stored in the second compartment (e.g., with the data element(s) being those elements to and/or from the data capability register(s) 120 in FIG. 1), (iv) thread-local storage capability 308-2 that indicates (e.g., points to) the thread-local storage element(s) 324-2 stored in the second compartment (e.g., with the thread-local storage element(s) being those elements to and/or from the thread-local storage capability register(s) 122 in FIG. 1), (v) code capability 310-2 that indicates (e.g., points to) the code element(s) 326-2 stored in the second compartment (e.g., with the code element(s) being those elements to and/or from the code capability register(s) 124 in FIG. 1), or (vi) data registers 312-2 that stores the data element(s) from the register(s) for that compartment (e.g., with the data element(s) being those elements to and/or from the general purpose (e.g., data) register(s) 126 and/or special purpose (e.g., data) register(s) 128 in FIG. 1).

In certain examples, a processor (e.g., physical core or logical core) is to switch (e.g., where only one compartment is to be active at any given time) between compartments, e.g., when executing that compartment's code on that compartment's data according to that compartment's state element(s). For a request to switch from compartment 1 to compartment 2, in certain examples, processor (e.g., processor 100 in FIG. 1) is to (e.g., in response to execution of a single instruction) populate compartment 1 descriptor 300-1 from the register(s) (e.g., register(s) 114 in FIG. 1) and the corresponding elements into compartment 1 in compartments 301, and then populate the elements indicated by the compartment 2 descriptor 300-2 into the register(s) (e.g., register(s) 114 in FIG. 1) from the compartment 2 descriptor 300-2 and/or the corresponding elements from compartment 2 in compartments 301, and vice-versa to switch from compartment 2 to compartment 1.

In certain examples, each descriptor includes a busy flag to help avoid corrupting a descriptor that already contains saved elements (e.g., saved state) and/or to avoid loading from an empty descriptor. In certain examples, first compartment descriptor 300-1 includes a descriptor busy flag 316-1, e.g., that when set, indicates to the processor that the first compartment is active in the processor (e.g., core), e.g., the registers are loaded for use in executing code of that first compartment, and/or second compartment descriptor 300-2 includes a descriptor busy flag 316-2, e.g., that when set, indicates to the processor that the second compartment is active in the processor (e.g., core), e.g., the registers are loaded for use in executing code of that second compartment.

In certain examples, only a single busy flag is to be active (e.g., set to a first "active" value (e.g., 1) from a second "inactive" value (e.g., 0)) at any time (e.g., only one busy flag is to be active in one thread). In certain examples, a processor is to set the busy flag when a load of elements into the register(s) from a compartment descriptor (e.g., and its compartment) is complete, e.g., and cleared when a store of elements from the register(s) into the compartment descriptor (e.g., and its compartment) is begun or complete.

In certain examples, each descriptor includes an indication of (e.g., a bitmap that indicates) which registers (e.g., data registers) are to be saved and/or restored, for example, indicating a proper subset of the registers whose content is to be saved into memory (e.g., into a compartment descriptor and/or compartment) and/or restoring their content from memory (e.g., from a compartment descriptor and/or compartment) into the proper subset of the registers, since automatically saving and/or restoring all registers could introduce significant, unnecessary overhead. In certain examples, first compartment descriptor 300-1 includes a data register bitmap 314-1, for example, that when a corresponding bit for each register of a plurality of registers is set, indicates to the processor (i) which register(s) are to have their content saved into memory (e.g., into a compartment descriptor and/or compartment) and/or (ii) which register(s) are to have their content restored from memory (e.g., from a compartment descriptor and/or compartment). In one example, a bitmap indicates (i) which of a plurality of general purpose (e.g., data) registers 126 and/or which of a plurality of special purpose (e.g., data) register(s) 128 in FIG. 1 are to have their content saved into memory (e.g., into a compartment descriptor and/or compartment) and/or (ii) which of a plurality of general purpose (e.g., data) registers 126 and/or which of a plurality of special purpose (e.g., data) register(s) 128 in Figure are to have their content restored from memory (e.g., from a compartment descriptor and/or compartment). In certain examples, a compartment ID is additionally specified in each compartment descriptor, and a register to specify the current compartment ID is loaded with the compartment ID value from the descriptor being loaded when entering a compartment.

In certain examples, one or more (e.g., each capability) within a descriptor is individually tagged to avoid capability forgery, but that may still leave saved data registers potentially vulnerable. Instead, in certain examples, access to the descriptor could be limited to require a valid capability to the descriptor itself (e.g., as a capability to access one or more other capabilities in a descriptor). In certain examples, the capability to the descriptor is marked as such, e.g., so that arbitrary reads and writes are not permitted to the descriptor, and (e.g., only) complete save and/or restore operations are permitted to the descriptor.

In certain examples, descriptors are encrypted (e.g., by encryption/decryption circuit 132 in FIG. 1) so that even if unauthorized access is provided to the memory containing the descriptor, the adversary will not be able to access (e.g., disclose or corrupt)) plaintext capabilities and/or register contents. In certain examples, capabilities themselves are encrypted to mitigate forgery and corruption attempts, which may obviate the need for a validity tag. In certain examples, each capability may span multiple registers.

Figure 4:
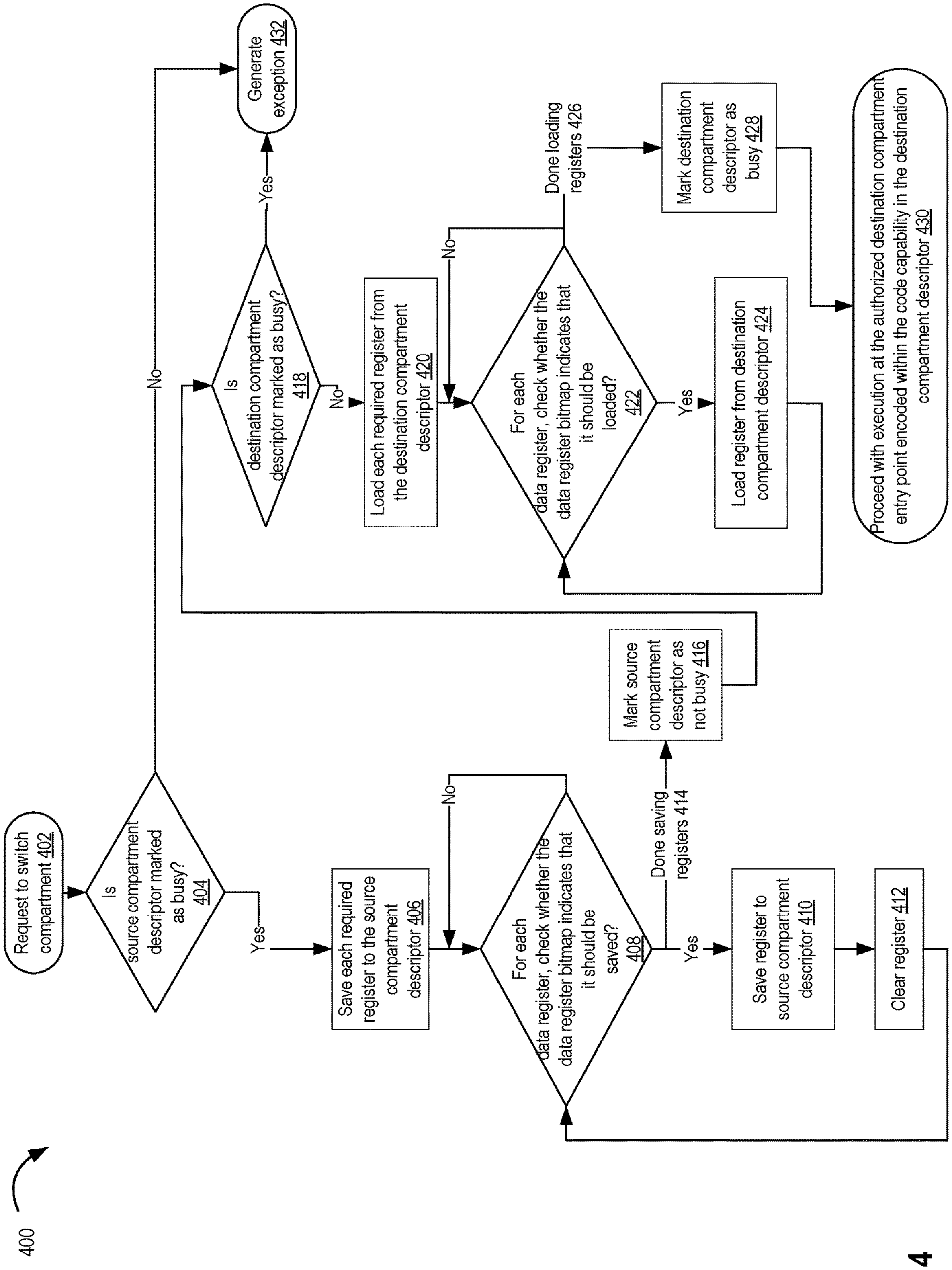
FIG. 4 illustrates operations of a method of switching compartments according to examples of the disclosure.

FIG. 4 illustrates operations 400 of a method of switching compartments according to examples of the disclosure, e.g., as caused by the execution of a single switch compartment instruction. Some or all of the operations 400 (or other processes described herein, or variations, and/or combinations thereof) are performed under the control of a processor (e.g., including a capability management circuit) as implemented herein and/or one or more computer systems configured with executable instruction(s) and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 400 are performed by a processor of the other figures.

The operations 400 include, at block 402, a request to switch a compartment, e.g., from a source compartment (having a corresponding source compartment descriptor) currently executing on a processor (e.g., core) to a destination compartment (having a corresponding destination compartment descriptor) that is to execute on the processor (e.g., core). The operations 400 further include, at block 404, checking if the source compartment descriptor is marked as busy, and if no (e.g., it is set to inactive), generating an exception at 432, and if yes (e.g., it is set to active), saving the elements from each required register to the source compartment descriptor (e.g., and into the source compartment) at 406. The operations 400 further include, at block 408, for each (e.g., data) register, checking whether the (e.g., data) register bitmap indicates that it should be saved, and if yes, saving the elements from the register into the source compartment descriptor (e.g., and into the source compartment) at 410, and then clearing that register at 412, and if no (e.g., all the registers have their elements saved), proceeding at 414 as the registers are done saving, and then marking the source compartment descriptor as not busy (e.g., set to inactive) at 416. The operations 400 further include, at block 418, checking if the destination compartment descriptor is marked as busy (e.g., already set to active), and if yes, generating an exception at 432, and if no (e.g., currently inactive), loading the elements into each required register from the destination compartment descriptor (e.g., and into the destination compartment) at 420. The operations 400 further include, at block 422, checking whether the (e.g., data) register bitmap indicates that it should be loaded, and if yes, loading the elements into the register from the destination compartment descriptor (e.g., and from the destination compartment) at 424, and if no (e.g., all the registers have not be loaded), repeating 424 until they have been loaded, and when completed, proceeding at 426 as the registers are done loading, and then marking the destination compartment descriptor as busy (e.g., currently active) at 428, and then proceeding with execution at the authorized destination compartment entry point encoded within the code capability in the destination compartment descriptor at 430.

Example Switch Compartment Instruction Format

In certain examples, a switch compartment (SwitchCompartment) instruction is to switch from (i) a first (e.g., source) compartment having a first (e.g., source) compartment descriptor as a first operand (e.g., register or memory) into (ii) a second (e.g., destination) compartment having a second (e.g., destination) compartment descriptor as a second operand (e.g., register or memory).

In certain examples, the format of the SwitchCompartment instruction is:

SwitchCompartment dest, src where dest is a destination operand that identifies the second (e.g., destination) compartment descriptor (e.g., where dest is (i) a memory address storing a pointer or capability to the second (e.g., destination) compartment descriptor, (ii) a register storing a pointer or capability to the second (e.g., destination) compartment descriptor, or (iii) a memory address of the second (e.g., destination) compartment;

where src is a source operand that identifies the first (e.g., source) compartment descriptor (e.g., where src is (i) a memory address storing a pointer or capability to the first (e.g., source) compartment descriptor, (ii) a register storing a pointer or capability to the first (e.g., source) compartment descriptor, or (iii) a memory address of the first (e.g., source) compartment descriptor; and SwitchCompartment is the mnemonic (e.g., corresponding to an opcode) that indicates the execution circuitry is to cause a save of the current register values into the compartment descriptor referenced by the source operand, clear (e.g., zero out) the saved registers to avoid disclosing their contents to the destination compartment (e.g., check the bitmap embedded within that descriptor to determine which registers to load), and load new register values from the compartment descriptor referenced by the destination operand (e.g., and check the bitmap embedded within that descriptor to determine which registers to load). In certain examples, one or both of the src or dest operands are capability registers. In certain examples, either the src or dest operand may be specified as a null value, e.g., 0, which will cause SwitchCompartment to skip accesses to the missing compartment descriptor.

In certain examples, a first compartment is a first function (e.g., as a service in a cloud) and the second compartment is a second function (e.g., as a service in the cloud), e.g., where both are part of a same process, but compartmentalization is used to avoid socket to socket communications.

Figure 5:
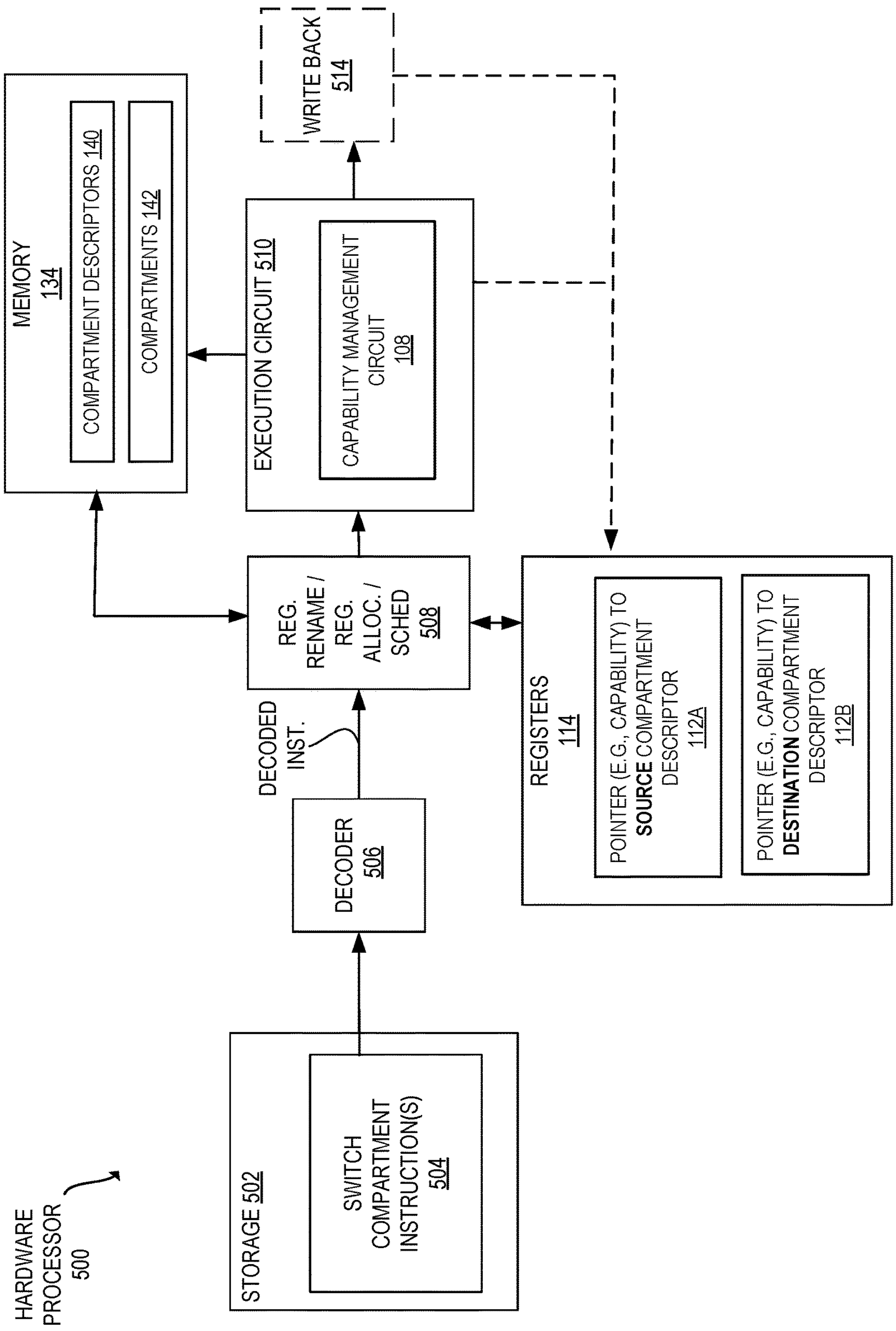
FIG. 5 illustrates a hardware processor coupled to storage that includes one or more switch compartment instructions according to examples of the disclosure.

FIG. 5 illustrates a hardware processor 500 coupled to storage 502 that includes one or more switch compartment instructions 504 according to examples of the disclosure. In certain examples, a switch compartment instruction is according to any of the disclosure herein. In certain examples, a switch compartment instruction includes a field indicating it is allowed (e.g., has the capability) to access certain element(s) stored in memory 134 (e.g., a compartment descriptor 140 and/or the fields in the corresponding compartment 142) and access the corresponding registers 114 (e.g., as shown in FIG. 1). In certain examples, a source compartment descriptor in compartment descriptors 140 is identified by a pointer (e.g., capability) 112A to that source compartment descriptor and a destination compartment descriptor in compartment descriptors 140 is identified by a pointer (e.g., capability) 112B to that destination compartment descriptor.

In certain examples, execution of a switch compartment instruction includes checking if an access to a compartment descriptor and/or the fields in the corresponding compartment are allowed (e.g., has the capability).

In certain examples, a source compartment descriptor includes one or more capabilities that protect corresponding fields (e.g., objects) of elements in that compartment.

For example in reference to FIG. 3, where first compartment descriptor 300-1 includes any one or combination of: (i) shadow stack capability 302-1 that indicates (e.g., points to) the shadow stack element(s) 318-1 stored in the first compartment (e.g., with the shadow stack element(s) being those elements to and/or from the shadow stack pointer (e.g., capability) register(s) 116 in FIG. 1), (ii) stack capability 304-1 that indicates (e.g., points to) the stack element(s) 320-1 stored in the first compartment (e.g., with the stack element(s) being those elements to and/or from the stack pointer (e.g., capability) register(s) 118 in FIG. 1), (iii) data capability 306-1 that indicates (e.g., points to) the data element(s) 322-1 stored in the first compartment (e.g., with the data element(s) being those elements to and/or from the data capability register(s) 120 in FIG. 1), (iv) thread-local storage capability 308-1 that indicates (e.g., points to) the thread-local storage element(s) 324-1 stored in the first compartment (e.g., with the thread-local storage element(s) being those elements to and/or from the thread-local storage capability register(s) 122 in FIG. 1), (v) code capability 310-1 that indicates (e.g., points to) the code element(s) 326-1 stored in the first compartment (e.g., with the code element(s) being those elements to and/or from the code capability register(s) 124 in FIG. 1), or (vi) data registers 312-1 that stores the data element(s) from the register(s) for that compartment (e.g., with the data element(s) being those elements to and/or from the general purpose (e.g., data) register(s) 126 and/or special purpose (e.g., data) register(s) 128 in FIG. 1).

For example in reference to FIG. 3, where second compartment descriptor 300-2 includes any one or combination of: (i) shadow stack capability 302-2 that indicates (e.g., points to) the shadow stack element(s) 318-2 stored in the second compartment (e.g., with the shadow stack element(s) being those elements to and/or from the shadow stack pointer (e.g., capability) register(s) 116 in FIG. 1), (ii) stack capability 304-2 that indicates (e.g., points to) the stack element(s) 320-2 stored in the second compartment (e.g., with the stack element(s) being those elements to and/or from the stack pointer (e.g., capability) register(s) 118 in FIG. 1), (iii) data capability 306-2 that indicates (e.g., points to) the data element(s) 322-2 stored in the second compartment (e.g., with the data element(s) being those elements to and/or from the data capability register(s) 120 in FIG. 1), (iv) thread-local storage capability 308-2 that indicates (e.g., points to) the thread-local storage element(s) 324-2 stored in the second compartment (e.g., with the thread-local storage element(s) being those elements to and/or from the thread-local storage capability register(s) 122 in FIG. 1), (v) code capability 310-2 that indicates (e.g., points to) the code element(s) 326-2 stored in the second compartment (e.g., with the code element(s) being those elements to and/or from the code capability register(s) 124 in FIG. 1), or (vi) data registers 312-2 that stores the data element(s) from the register(s) for that compartment (e.g., with the data element(s) being those elements to and/or from the general purpose (e.g., data) register(s) 126 and/or special purpose (e.g., data) register(s) 128 in FIG. 1).

In certain examples, e.g., in response to a request to perform a switch compartment operation, the instruction 504 (e.g., macro-instruction) is fetched from storage 502 and sent to decoder 506. In the depicted example, the decoder 506 (e.g., decoder circuit) decodes the instruction into a decoded instruction (e.g., one or more micro-instructions or micro-operations). The decoded instruction is then sent for execution, e.g., via scheduler circuit 508 to schedule the decoded instruction for execution.

In certain examples, (e.g., where the processor/core supports out-of-order (OoO) execution), the processor includes a register rename/allocator circuit 508 coupled to register file 114 (e.g., and memory 134) to allocate resources and perform register renaming on registers (e.g., registers associated with the initial sources and final destination of the instruction). In certain examples, (e.g., for out-of-order execution), the processor includes one or more scheduler circuits 508 coupled to the decoder 506. The scheduler circuit(s) may schedule one or more operations associated with decoded instructions, including one or more operations decoded from a switch compartment instruction 504, e.g., for execution on the execution circuit 510. In the depicted example, capability management circuit 108 is within the execution circuit 510.

As one example, a decoded switch compartment instruction 504 is to cause a switch from (i) the first (e.g., source) compartment having a first (e.g., source) compartment descriptor as a first operand (e.g., register or memory) into (ii) a second (e.g., destination) compartment having a second (e.g., destination) compartment descriptor as a second operand (e.g., register or memory). In certain examples, the execution includes checking by capability management circuit 108 that the requested loads and stores are permitted for the switch.

In certain examples, a write back circuit 514 is included to write back results of an instruction to a destination (e.g., write them to registers 512), for example, so those results are visible within a processor (e.g., visible outside of the execution circuit that produced those results).

One or more of these components (e.g., decoder 506, register rename/register allocator/scheduler 508, execution circuit 510, registers (e.g., register file) 512, memory 134, or write back circuit 514) may be in a single core of a hardware processor (e.g., and multiple cores each with an instance of these components).

Figure 6:
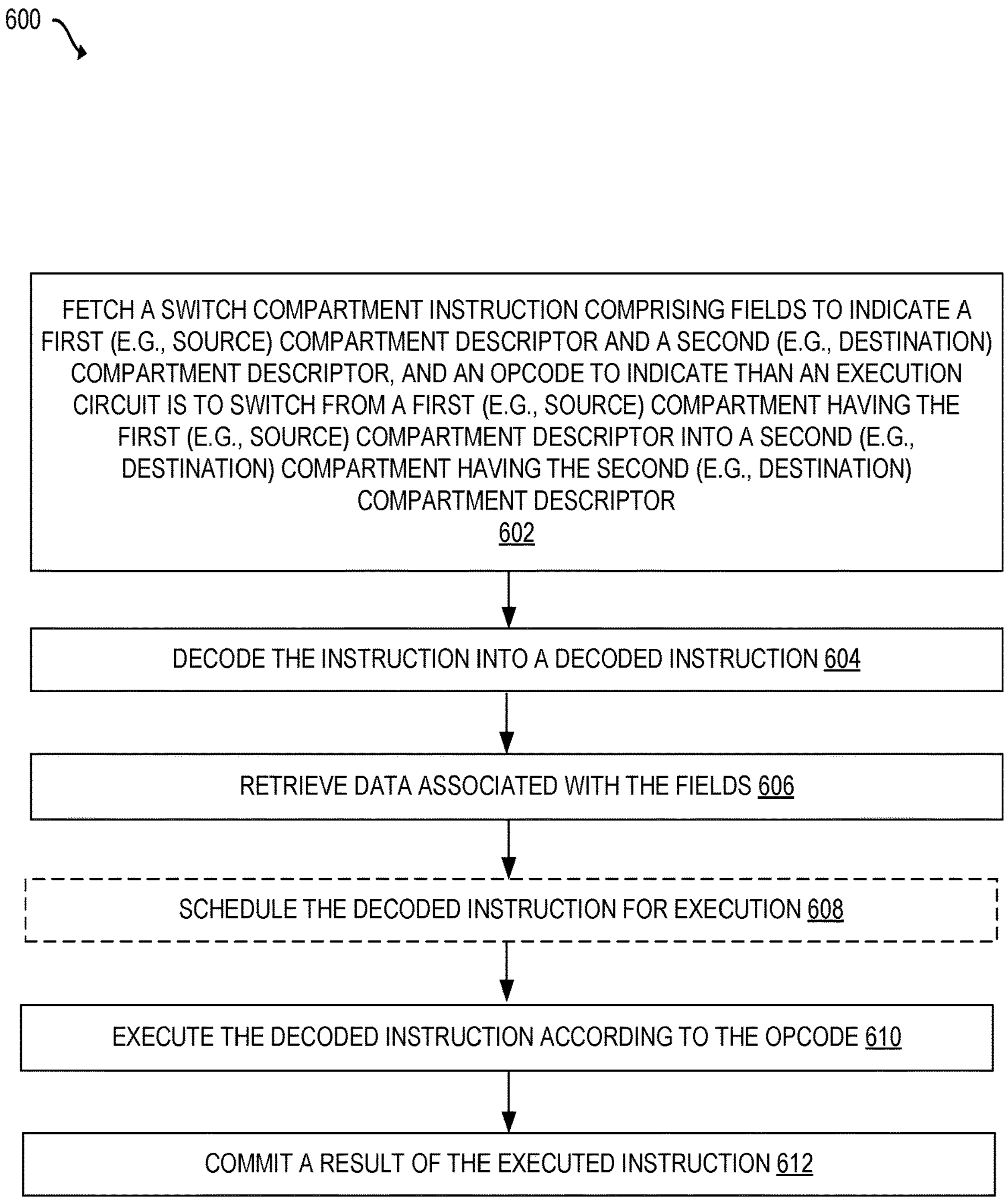
FIG. 6 illustrates operations of a method of processing a switch compartment instruction according to examples of the disclosure.

FIG. 6 illustrates operations 600 of a method of processing a switch compartment instruction according to examples of the disclosure. In certain examples, a processor (e.g., or processor core) performs the method, e.g., in response to receiving a request to execute an instruction from software. Depicted operations 600 of the method include processing a single switch compartment instruction by: fetch the switch compartment instruction comprising fields to indicate a first (e.g., source) compartment descriptor and a second (e.g., destination) compartment descriptor, and an opcode to indicate than an execution circuit is to switch from a first (e.g., source) compartment having the first (e.g., source) compartment descriptor into a second (e.g., destination) compartment having the second (e.g., destination) compartment descriptor at 602, decode the instruction into a decoded instruction at 604, retrieve data associated with the fields at 606, (optionally) schedule the decoded instruction for execution at 608, execute the decoded instruction according to the opcode at 610, and commit a result of the executed instruction at 612.

Example Initialize Compartment Instruction Format

In certain examples, an initialize compartment (InitializeCompartment) instruction initializes the information (e.g., metadata) within a descriptor. In certain examples, an initialize compartment (InitializeCompartment) instruction is to initialize the memory referenced by a destination operand in the format of a compartment descriptor with space for all of the required capabilities for that compartment (e.g., from capability registers) and other information (e.g., from data registers), e.g., as specified by a bitmap in a source (e.g., register or memory) operand. For example, the bitmap could specify whether each general-purpose register and each special purpose register should be saved using a separate bit within the bitmap. In certain examples, the bitmap is generated by a compiler.

In certain examples, the format of the InitializeCompartment instruction is:

InitializeCompartment dest, src where dest is a destination operand that identifies the (e.g., destination) compartment descriptor (e.g., where dest is (i) a memory address storing a pointer or capability to the second (e.g., destination) compartment descriptor, (ii) a register storing a pointer or capability to the second (e.g., destination) compartment descriptor, or (iii) a memory address of the second (e.g., destination) compartment;

where src is a source operand (e.g., register) that identifies (e.g., via compartment data such as, but not limited to, a register bitmap) the other register(s) (e.g., registers 114 in FIG. 1) that are to have their elements stored into the compartment descriptor (e.g., and the corresponding compartment); and InitializeCompartment is the mnemonic (e.g., corresponding to an opcode) that indicates the execution circuity is to cause an initialization (e.g., populate) the memory referenced by a destination operand in the format of a compartment descriptor with space for all of the required capabilities for that compartment (e.g., from capability registers) and other data (e.g., from data registers), e.g., as specified by a value (e.g., bitmap) in a source (e.g., register or memory) operand. In certain examples, one or both of the src or dest operands are capability registers. The busy flag may initially be set by InitializeCompartment so that a subsequent SwitchCompartment instruction that specifies the new compartment descriptor as its src operand will succeed.

Figure 7:
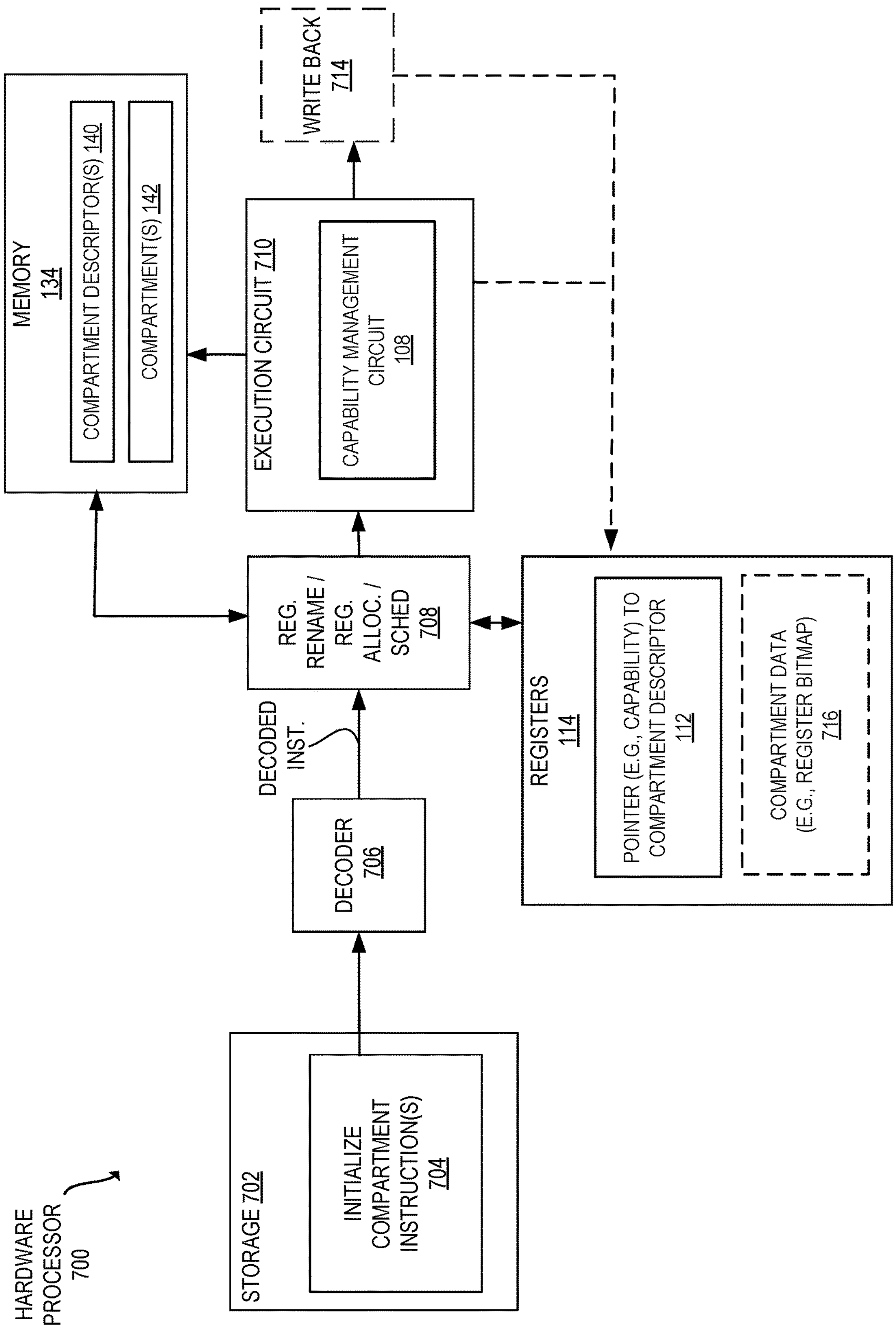
FIG. 7 illustrates operations of a hardware processor coupled to storage that includes one or more initialize compartment instructions according to examples of the disclosure.

FIG. 7 illustrates a hardware processor 700 coupled to storage 702 that includes one or more initialize compartment instructions 704 according to examples of the disclosure. In certain examples, an initialize compartment instruction is according to any of the disclosure herein. In certain examples, an initialize compartment instruction includes a field indicating it is allowed (e.g., has the capability) to access certain element(s) stored in memory 134 (e.g., a compartment descriptor 140 and/or the fields in the corresponding compartment 142) and access the corresponding registers 114 (e.g., as shown in FIG. 1). In certain examples, a (e.g., destination) compartment descriptor in compartment descriptors 140 is identified by a pointer (e.g., capability)

112 to that (e.g., destination) compartment descriptor. In certain examples, compartment data 716 (e.g., register bitmap) is included to indicate which of the registers 114 (e.g., in FIG. 1) are to have their elements saved into (e.g., destination) compartment descriptor (e.g., and corresponding compartment). In certain examples, execution of an initialize compartment instruction includes checking if an access to a compartment descriptor and/or the fields in the corresponding compartment are allowed (e.g., has the capability).

In certain examples, a (e.g., destination) compartment descriptor format includes one or more capabilities that protect corresponding fields (e.g., objects) of elements in that compartment.

For example in reference to FIG. 3, where first compartment descriptor 300-1 is initialized to include any one or combination of: (i) shadow stack capability 302-1 that indicates (e.g., points to) the shadow stack element(s) 318-1 stored in the first compartment (e.g., with the shadow stack element(s) being those elements to and/or from the shadow stack pointer (e.g., capability) register(s) 116 in FIG. 1), (ii) stack capability 304-1 that indicates (e.g., points to) the stack element(s) 320-1 stored in the first compartment (e.g., with the stack element(s) being those elements to and/or from the stack pointer (e.g., capability) register(s) 118 in FIG. 1), (iii) data capability 306-1 that indicates (e.g., points to) the data element(s) 322-1 stored in the first compartment (e.g., with the data element(s) being those elements to and/or from the data capability register(s) 120 in FIG. 1), (iv) thread-local storage capability 308-1 that indicates (e.g., points to) the thread-local storage element(s) 324-1 stored in the first compartment (e.g., with the thread-local storage element(s) being those elements to and/or from the thread-local storage capability register(s) 122 in FIG. 1), (v) code capability 310-1 that indicates (e.g., points to) the code element(s) 326-1 stored in the first compartment (e.g., with the code element(s) being those elements to and/or from the code capability register(s) 124 in FIG. 1), or (vi) data registers 312-1 that stores the data element(s) from the register(s) for that compartment (e.g., with the data element(s) being those elements to and/or from the general purpose (e.g., data) register(s) 126 and/or special purpose (e.g., data) register(s) 128 in FIG. 1).

For example in reference to FIG. 3, where second compartment descriptor 300-2 is initialized to include any one or combination of: (i) shadow stack capability 302-2 that indicates (e.g., points to) the shadow stack element(s) 318-2 stored in the second compartment (e.g., with the shadow stack element(s) being those elements to and/or from the shadow stack pointer (e.g., capability) register(s) 116 in FIG. 1), (ii) stack capability 304-2 that indicates (e.g., points to) the stack element(s) 320-2 stored in the second compartment (e.g., with the stack element(s) being those elements to and/or from the stack pointer (e.g., capability) register(s) 118 in FIG. 1), (iii) data capability 306-2 that indicates (e.g., points to) the data element(s) 322-2 stored in the second compartment (e.g., with the data element(s) being those elements to and/or from the data capability register(s) 120 in FIG. 1), (iv) thread-local storage capability 308-2 that indicates (e.g., points to) the thread-local storage element(s) 324-2 stored in the second compartment (e.g., with the thread-local storage element(s) being those elements to and/or from the thread-local storage capability register(s) 122 in FIG. 1), (v) code capability 310-2 that indicates (e.g., points to) the code element(s) 326-2 stored in the second compartment (e.g., with the code element(s) being those elements to and/or from the code capability register(s) 124 in FIG. 1), or (vi) data registers 312-2 that stores the data element(s) from the register(s) for that compartment (e.g., with the data element(s) being those elements to and/or from the general purpose (e.g., data) register(s) 126 and/or special purpose (e.g., data) register(s) 128 in FIG. 1).

In certain examples, e.g., in response to a request to perform an initialize compartment operation, the instruction (e.g., macro-instruction) 704 is fetched from storage 702 and sent to decoder 706. In the depicted example, the decoder 706 (e.g., decoder circuit) decodes the instruction into a decoded instruction (e.g., one or more micro-instructions or micro-operations). The decoded instruction is then sent for execution, e.g., via scheduler circuit 708 to schedule the decoded instruction for execution.

In certain examples, (e.g., where the processor/core supports out-of-order (OoO) execution), the processor includes a register rename/allocator circuit 708 coupled to register file 114 (e.g., and memory 134) to allocate resources and perform register renaming on registers (e.g., registers associated with the initial sources and final destination of the instruction). In certain examples, (e.g., for out-of-order execution), the processor includes one or more scheduler circuits 708 coupled to the decoder 706. The scheduler circuit(s) may schedule one or more operations associated with decoded instructions, including one or more operations decoded from an initialize compartment instruction 704, e.g., for execution on the execution circuit 710. In the depicted example, capability management circuit 108 is within the execution circuit 710.

As one example, a decoded initialize compartment instruction 704 is to cause the memory 134 referenced by a destination operand (e.g., capability or pointer 112) to be initialized (e.g., populated) in the format of a compartment descriptor 140 with space for all of the required capabilities for that compartment 142 (e.g., from capability registers), for example, and with space for any other information (e.g., from data registers), e.g., as specified by compartment data 716 (e.g., a bitmap) in a source (e.g., register or memory) operand. In certain examples, the execution includes checking by capability management circuit 108 that the requested loads and stores are permitted for the initialization.

In certain examples, a write back circuit 714 is included to write back results of an instruction to a destination (e.g., write them to memory 134), for example, so those results are visible within the memory 134 (e.g., visible outside of the execution circuit that produced those results).

One or more of these components (e.g., decoder 706, register rename/register allocator/scheduler 708, execution circuit 710, registers (e.g., register file) 712, memory 134, or write back circuit 714) may be in a single core of a hardware processor (e.g., and multiple cores each with an instance of these components).

Figure 8:
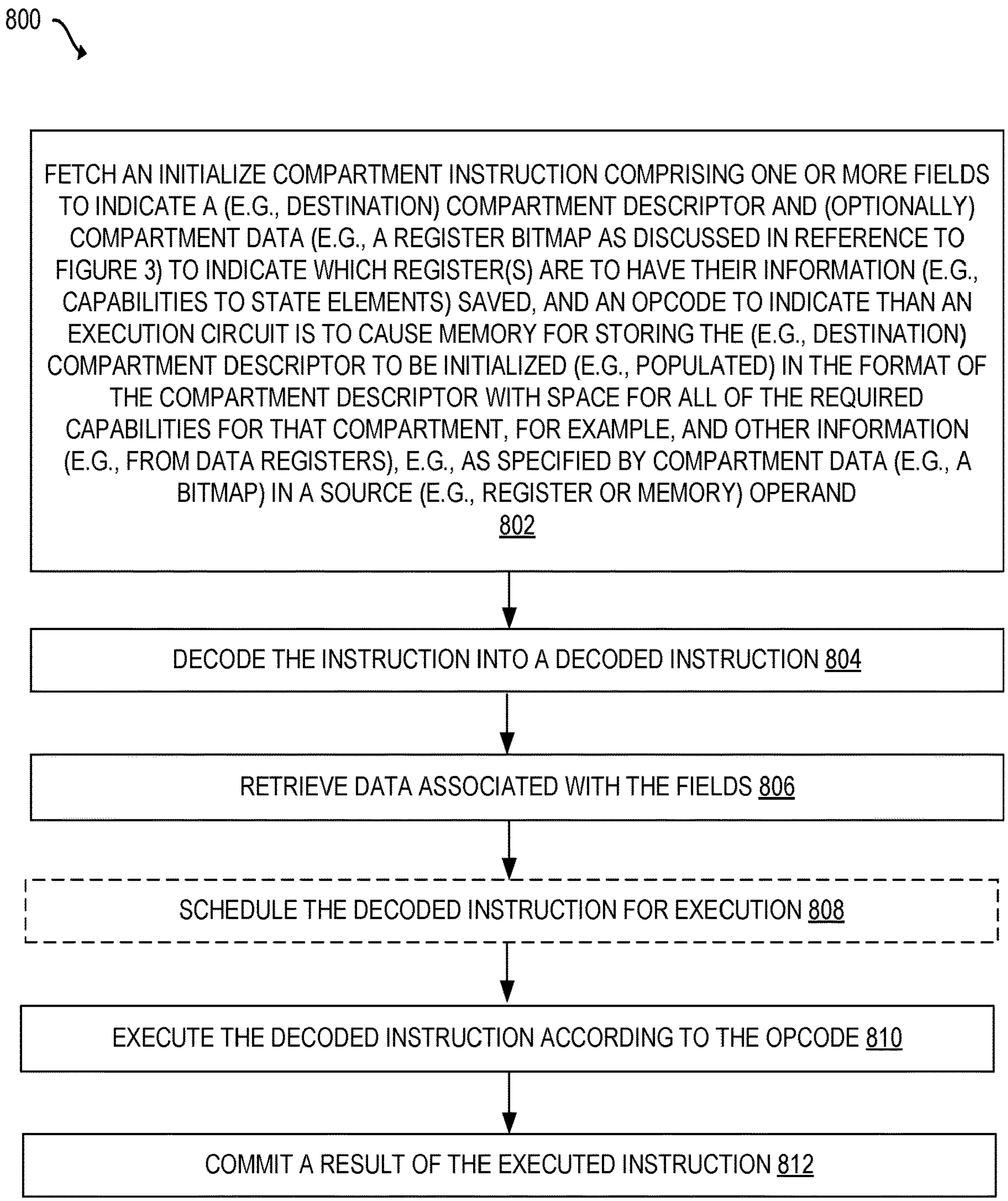
FIG. 8 illustrates a method of processing an initialize compartment instruction according to examples of the disclosure.

FIG. 8 illustrates operations 800 of a method of processing an initialize compartment instruction according to examples of the disclosure. In certain examples, an initialize compartment instruction is called by a thread creation routine (e.g., pthread). In certain examples, a processor (e.g., or processor core) performs the method, e.g., in response to receiving a request to execute an instruction from software. Depicted operations 800 of the method include processing a single initialize compartment instruction by: fetch the initialize compartment instruction comprising one or more fields to indicate a (e.g., destination) compartment descriptor and (optionally) compartment data (e.g., a register bitmap as discussed in reference to FIG. 3) to indicate which register(s) are to have their information (e.g., capability(ies) to state elements) saved, and an opcode to indicate than an execution circuit is to cause memory for storing the (e.g., destination) compartment descriptor to be initialized (e.g., populated) in the format of the compartment descriptor with space for all of the required capabilities for that compartment, for example, and other information (e.g., from data registers), e.g., as specified by compartment data (e.g., a bitmap) in a source (e.g., register or memory) operand at 802, decode the instruction into a decoded instruction at 804, retrieve data associated with the fields at 806, (optionally) schedule the decoded instruction for execution at 808, execute the decoded instruction according to the opcode at 810, and commit a result of the executed instruction at 812.

Exemplary architectures, systems, etc. that the above may be used in are detailed below. Exemplary instruction formats for capability instructions are detailed below.

At least some examples of the disclosed technologies can be described in view of the following examples:

Example 1. An apparatus comprising:

a capability management circuit to check a capability for a memory access request, the capability comprising an address field and a bounds field that is to indicate a lower bound and an upper bound of an address range to which the capability authorizes access;

a decoder circuit to decode a single instruction into a decoded single instruction, the single instruction comprising one or more fields to indicate a first compartment descriptor that identifies a first capability to a first state element in a first compartment of memory and a second capability to a second state element in the first compartment of the memory, and an opcode to indicate that an execution circuit is to load the first capability from the first compartment descriptor of the memory into a first register to enable the capability management circuit to determine whether a first bounds field of the first capability authorizes an access to the first state element in the first compartment of the memory, and load the second capability from the first compartment descriptor of the memory into a second register to enable the capability management circuit to determine that a second bounds field of the second capability authorizes an access to the second state element in the first compartment of the memory; and the execution circuit to execute the decoded single instruction according to the opcode.

Example 2. The apparatus of example 1, wherein the one or more fields comprise a first compartment descriptor capability that comprises a first compartment descriptor address field of the first compartment descriptor in the memory and a first compartment descriptor bounds field that is to indicate a lower bound and an upper bound of the first compartment descriptor in the memory, and the opcode is to further indicate that the execution circuit is to access the first compartment descriptor in the memory in response to a determination by the capability management circuit that a first compartment descriptor address from the first compartment descriptor address field is within the lower bound and the upper bound from the first compartment descriptor bounds field.

Example 3. The apparatus of example 1, wherein:

the one or more fields of the single instruction indicate a second compartment descriptor that identifies a third capability to a third state element in a second compartment of the memory and a fourth capability to a fourth state element in the second compartment of the memory; and the opcode is to further indicate that the execution circuit is to, before the loads, store the third capability from the first register into the second compartment descriptor of the memory, and store the fourth capability from the second register into the second compartment descriptor of the memory.

Example 4. The apparatus of example 3, wherein the opcode is to further indicate that the execution circuit is to:

set a busy flag of the second compartment descriptor before the loads to stall the load of the first capability from the first compartment descriptor of the memory into the first register, and stall the load of the second capability from the first compartment descriptor of the memory into the second register; and clear the busy flag in response to completion of the stores.

Example 5. The apparatus of example 3, wherein the opcode is to further indicate that the execution circuit is to clear the first register and the second register before the loads.

Example 6. The apparatus of example 1, wherein:

the first compartment descriptor is to store a third set of state elements; and the opcode is to further indicate that the execution circuit is to load the third set of state elements from the first compartment descriptor into a third set of registers.

Example 7. The apparatus of example 6, wherein the first compartment descriptor comprises a bitmap field to indicate a proper subset of the third set of registers to load the third set of state elements into.

Example 8. The apparatus of example 1, wherein:

the decoder circuit is to decode a second single instruction into a decoded second single instruction, the second single instruction comprising one or more fields to indicate a location of the first compartment descriptor in the memory to store the first capability to the first state element in the first compartment of the memory and the second capability to the second state element in the first compartment of the memory, and an opcode to indicate that the execution circuit is to initialize the memory at the location in a format of a compartment descriptor with space for the first capability and the second capability; and the execution circuit to execute the decoded second single instruction according to its opcode.

Example 9. A method comprising:

checking, by a capability management circuit of a processor core, a capability for a memory access request, the capability comprising an address field and a bounds field that is to indicate a lower bound and an upper bound of an address range to which the capability authorizes access;

decoding, by a decoder circuit of the processor core, a single instruction into a decoded single instruction, the single instruction comprising one or more fields to indicate a first compartment descriptor that identifies a first capability to a first state element in a first compartment of memory and a second capability to a second state element in the first compartment of the memory, and an opcode indicating that an execution circuit of the processor core is to load the first capability from the first compartment descriptor of the memory into a first register to enable the capability management circuit to determine whether a first bounds field of the first capability authorizes an access to the first state element in the first compartment of the memory, and load the second capability from the first compartment descriptor of the memory into a second register to enable the capability management circuit to determine that a second bounds field of the second capability authorizes an access to the second state element in the first compartment of the memory; and executing, by the execution circuit, the decoded single instruction according to the opcode.

Example 10. The method of example 9, wherein the one or more fields comprise a first compartment descriptor capability that comprises a first compartment descriptor address field of the first compartment descriptor in the memory and a first compartment descriptor bounds field that is to indicate a lower bound and an upper bound of the first compartment descriptor in the memory, and the opcode is to further indicate that the execution circuit is to access the first compartment descriptor in the memory in response to a determination by the capability management circuit that a first compartment descriptor address from the first compartment descriptor address field is within the lower bound and the upper bound from the first compartment descriptor bounds field.

Example 11. The method of example 9, wherein:

the one or more fields of the single instruction indicate a second compartment descriptor that identifies a third capability to a third state element in a second compartment of the memory and a fourth capability to a fourth state element in the second compartment of the memory; and the opcode further indicates that the execution circuit is to, before the loads, store the third capability from the first register into the second compartment descriptor of the memory, and store the fourth capability from the second register into the second compartment descriptor of the memory.

Example 12. The method of example 11, wherein the opcode further indicates that the execution circuit is to:

set a busy flag of the second compartment descriptor before the loads to stall the load of the first capability from the first compartment descriptor of the memory into the first register, and stall the load of the second capability from the first compartment descriptor of the memory into the second register; and clear the busy flag in response to completion of the stores.

Example 13. The method of example 11, wherein the opcode further indicates that the execution circuit is to clear the first register and the second register before the loads.

Example 14. The method of example 9, wherein:

the first compartment descriptor stores a third set of state elements; and the opcode further indicates that the execution circuit is to load the third set of state elements from the first compartment descriptor into a third set of registers.

Example 15. The method of example 14, wherein the first compartment descriptor comprises a bitmap field that indicates a proper subset of the third set of registers to load the third set of state elements into.

Example 16. The method of example 9, further comprising:

decoding, by the decoder circuit, a second single instruction into a decoded second single instruction, the second single instruction comprising one or more fields to indicate a location of the first compartment descriptor in the memory to store the first capability to the first state element in the first compartment of the memory and the second capability to the second state element in the first compartment of the memory, and an opcode to indicate that the execution circuit is to initialize the memory at the location in a format of a compartment descriptor with space for the first capability and the second capability; and executing, by the execution circuit, the decoded second single instruction according to its opcode.

Example 17. A non-transitory machine readable medium that stores code that when executed by a machine causes the machine to perform a method comprising:

checking, by a capability management circuit of a processor core, a capability for a memory access request, the capability comprising an address field and a bounds field that is to indicate a lower bound and an upper bound of an address range to which the capability authorizes access;

decoding, by a decoder circuit of the processor core, a single instruction into a decoded single instruction, the single instruction comprising one or more fields to indicate a first compartment descriptor that identifies a first capability to a first state element in a first compartment of memory and a second capability to a second state element in the first compartment of the memory, and an opcode indicating that an execution circuit of the processor core is to load the first capability from the first compartment descriptor of the memory into a first register to enable the capability management circuit to determine that a first bounds field of the first capability authorizes an access to the first state element in the first compartment of the memory, and load the second capability from the first compartment descriptor of the memory into a second register to enable the capability management circuit to determine that a second bounds field of the second capability authorizes an access to the second state element in the first compartment of the memory; and executing, by the execution circuit, the decoded single instruction according to the opcode.

Example 18. The non-transitory machine readable medium of example 17, wherein the one or more fields comprise a first compartment descriptor capability that comprises a first compartment descriptor address field of the first compartment descriptor in the memory and a first compartment descriptor bounds field that is to indicate a lower bound and an upper bound of the first compartment descriptor in the memory, and the opcode is to further indicate that the execution circuit is to access the first compartment descriptor in the memory in response to a determination by the capability management circuit that a first compartment descriptor address from the first compartment descriptor address field is within the lower bound and the upper bound from the first compartment descriptor bounds field.

Example 19. The non-transitory machine readable medium of example 17, wherein:

the one or more fields of the single instruction indicate a second compartment descriptor that identifies a third capability to a third state element in a second compartment of the memory and a fourth capability to a fourth state element in the second compartment of the memory; and the opcode further indicates that the execution circuit is to, before the loads, store the third capability from the first register into the second compartment descriptor of the memory, and store the fourth capability from the second register into the second compartment descriptor of the memory.

Example 20. The non-transitory machine readable medium of example 19, wherein the opcode further indicates that the execution circuit is to:

set a busy flag of the second compartment descriptor before the loads to stall the load of the first capability from the first compartment descriptor of the memory into the first register, and stall the load of the second capability from the first compartment descriptor of the memory; and clear the busy flag in response to completion of the stores.

Example 21. The non-transitory machine readable medium of example 19, wherein the opcode further indicates that the execution circuit is to clear the first register and the second register before the loads.

Example 22. The non-transitory machine readable medium of example 17, wherein:

the first compartment descriptor stores a third set of state elements; and the opcode further indicates that the execution circuit is to load the third set of state elements from the first compartment descriptor into a third set of registers.

Example 23. The non-transitory machine readable medium of example 22, wherein the first compartment descriptor comprises a bitmap field that indicates a proper subset of the third set of registers to load the third set of state elements into.

Example 24. The non-transitory machine readable medium of example 17, wherein the method further comprises:

decoding, by the decoder circuit, a second single instruction into a decoded second single instruction, the second single instruction comprising one or more fields to indicate a location of the first compartment descriptor in the memory to store the first capability to the first state element in the first compartment of the memory and the second capability to the second state element in the first compartment of the memory, and an opcode to indicate that the execution circuit is to initialize the memory at the location in a format of a compartment descriptor with space for the first capability and the second capability; and executing, by the execution circuit, the decoded second single instruction according to its opcode.

In yet another example, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While examples are described in which both vector and scalar operations are supported through the vector friendly instruction format, alternative examples use only vector operations the vector friendly instruction format.

FIGS. 9A-9B are block diagrams illustrating a generic vector friendly instruction format and instruction templates thereof according to examples of the disclosure. FIG. 9A is a block diagram illustrating a generic vector friendly instruction format and class A instruction templates thereof according to examples of the disclosure; while FIG. 9B is a block diagram illustrating the generic vector friendly instruction format and class B instruction templates thereof according to examples of the disclosure. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While examples of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative examples may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a PxQ (e.g., 32×512, 16×128, 32×1024, 64×1024) register file. While in one example N may be up to three sources and one destination register, alternative examples may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one example this field also selects between three different ways to perform memory address calculations, alternative examples may support more, less, or different ways to perform memory address calculations.

Augmentation operation field 950—its content distinguishes which one of a variety of different operations to be performed in addition to the base operation. This field is context specific. In one example of the disclosure, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}$*index+base).

Displacement Field 962A—its content is used as part of memory address generation (e.g., for address generation that uses $2^{scale}$*index+base+displacement).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different examples may implement only one or none of the two.

Data element width field 964—its content distinguishes which one of a number of data element widths is to be used (in some examples for all instructions; in other examples for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While examples of the disclosure are described in which the write mask field's 970 content selects one of a number of write mask registers that contains the write mask to be used (and thus the write mask field's 970 content indirectly identifies that masking to be performed), alternative examples instead or additional allow the mask write field's 970 content to directly specify the masking to be performed.

Immediate field 972—its content allows for the specification of an immediate. This field is optional in the sense that it is not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described examples of the disclosure the round control field 954A includes a suppress all floating point exceptions (SAE) field 956 and a round operation control field 958, alternative examples may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one example of the disclosure where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one example of the disclosure where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one example is shown where the full opcode field 974 includes all of these fields, the full opcode field 974 includes less than all of these fields in examples that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some examples of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different examples of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10 is a block diagram illustrating an exemplary specific vector friendly instruction format according to examples of the disclosure. FIG. 10 shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10 map are illustrated.

It should be understood that, although examples of the disclosure are described with reference to the specific vector friendly instruction format 1000 in the context of the generic vector friendly instruction format 900 for illustrative purposes, the disclosure is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the disclosure is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one example of the disclosure).

The second-fourth bytes (EVEX Bytes 1-3) include a number of bit fields providing specific capability.

REX field 1005 (EVEX Byte 1, bits [7-5])—consists of an EVEX.R bit field (EVEX Byte 1, bit [7]—R), EVEX.X bit field (EVEX byte 1, bit [6]—X), and 957BEX byte 1, bit[5]—B). The EVEX.R, EVEX.X, and EVEX.B bit fields provide the same functionality as the corresponding VEX bit fields, and are encoded using 1 s complement form, e.g., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX field 910—this is the first part of the REX' field 910 and is the EVEX.R' bit field (EVEX Byte 1, bit [4]—R') that is used to encode either the upper 16 or lower 16 of the extended 32 register set. In one example of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative examples of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]—mmmm)—its content encodes an implied leading opcode byte (0F, 0F 38, or 0F 3).

Data element width field 964 (EVEX byte 2, bit [7]—W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111*b*. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]-U)—If EVEX.0=0, it indicates class A or EVEX.U0; if EVEX.U=1, it indicates class B or EVEX.U1.

Prefix encoding field 1025 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one example, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain examples expand in a similar fashion for consistency but allow for different meanings to be specified by these legacy SIMD prefixes. An alternative example may redesign the PLA to support the 2 bit SIMD prefix encodings, and thus not require the expansion.

Alpha field 952 (EVEX byte 3, bit [7]—EH; also known as EVEX.EH, EVEX.rs, EVEX.RL, EVEX.write mask control, and EVEX.N; also illustrated with a)—as previously described, this field is context specific.

Beta field 954 (EVEX byte 3, bits [6:4]-SSS, also known as EVEX.$s_{2.0}$, EVEX.$r_{2-0}$, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]-kkk)—its content specifies the index of a register in the write mask registers as previously described. In one example of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

FIG. 10B is a block diagram illustrating the fields of the specific vector friendly instruction format 1000 that make up the full opcode field 974 according to one example of the disclosure. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to one example of the disclosure. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

FIG. 10D is a block diagram illustrating the fields of the specific vector friendly instruction format 1000 that make up the augmentation operation field 950 according to one example of the disclosure. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]—EH) is interpreted as the rs field 952A. When the rs field 952A contains a 1 (round 952A.1), the beta field 954 (EVEX byte 3, bits [6:4]—SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]—SSS) is interpreted as a three bit data transform field 954B. When U=0 and the MOD field 1042 contains 00, 01, or 10 (signifying a memory access operation), the alpha field 952 (EVEX byte 3, bit [7]—EH) is interpreted as the eviction hint (EH) field 952B and the beta field 954 (EVEX byte 3, bits [6:4]—SSS) is interpreted as a three bit data manipulation field 954C.

When U=1, the alpha field 952 (EVEX byte 3, bit [7]—EH) is interpreted as the write mask control (Z) field 952C. When U=1 and the MOD field 1042 contains 11 (signifying a no memory access operation), part of the beta field 954 (EVEX byte 3, bit [4]—$S_0$) is interpreted as the RL field 957A; when it contains a 1 (round 957A.1) the rest of the beta field 954 (EVEX byte 3, bit [6-5]—$S_{2-1}$) is interpreted as the round operation field 959A, while when the RL field 957A contains a 0 (VSIZE 957.A2) the rest of the beta field 954 (EVEX byte 3, bit [6-5]—$S_{2-1}$) is interpreted as the vector length field 959B (EVEX byte 3, bit [6-5]—$L_{1-0}$). When U=1 and the MOD field 1042 contains 00, 01, or 10 (signifying a memory access operation), the beta field 954 (EVEX byte 3, bits [6:4]—SSS) is interpreted as the vector length field 959B (EVEX byte 3, bit [6-5]—$L_{1-0}$) and the broadcast field 957B (EVEX byte 3, bit [4]—B).

Exemplary Register Architecture

Figure 11:
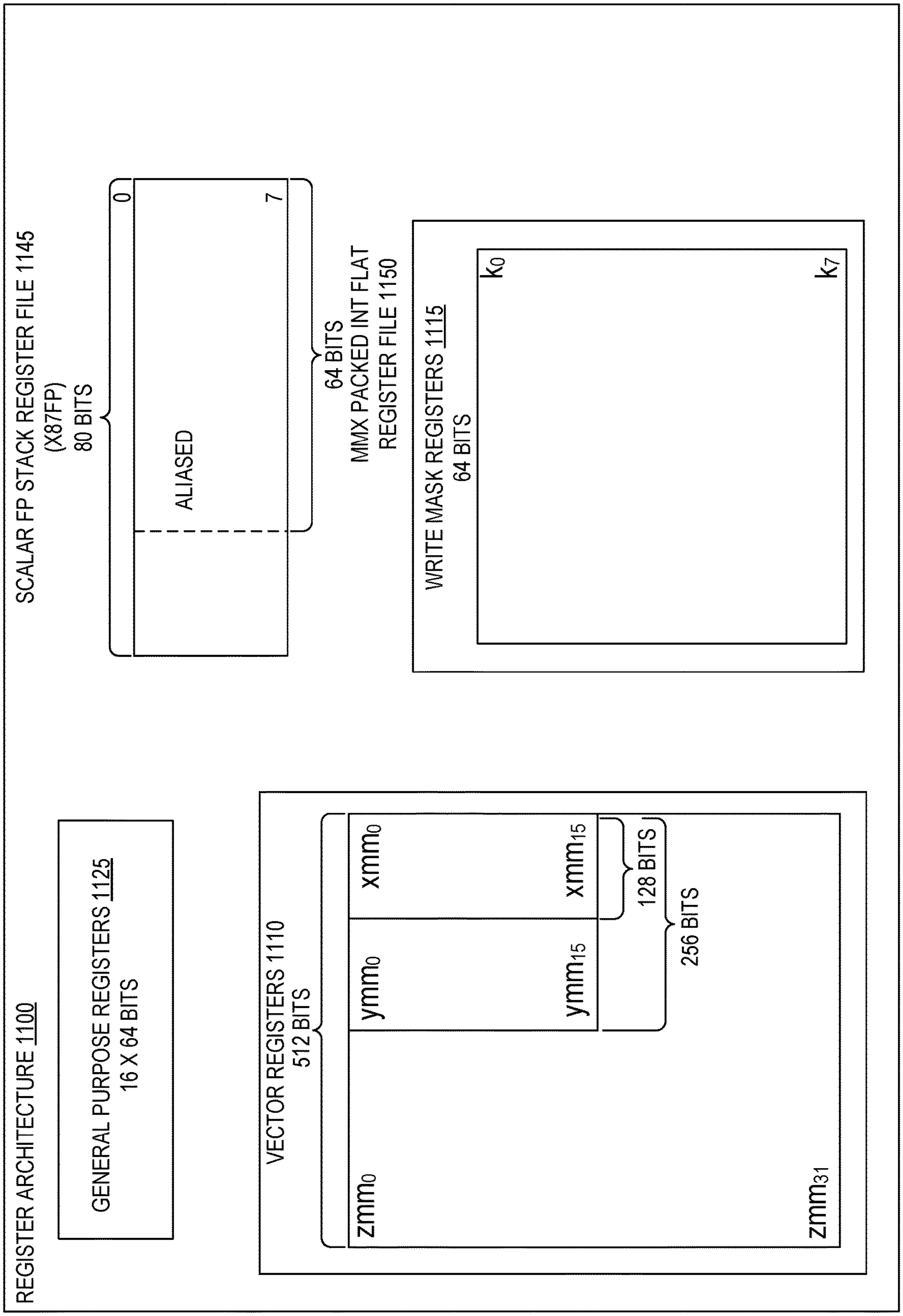
FIG. 11 is a block diagram of a register architecture according to one example of the disclosure

FIG. 11 is a block diagram of a register architecture 1100 according to one example of the disclosure. In the example illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

| Adjustable Vector Length | Class | Operations | Registers |
|---|---|---|---|
| Instruction Templates that do not include the vector length field 959B | A (FIG. 9A; U = 0) | 910, 915, 925, 930 | zmm registers (the vector length is 64 byte) |
| | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instructions templates without the vector length field 959B operate on the maximum vector length. Further, in one example, the class B instruction templates of the specific vector friendly instruction format 1000 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the example.

Write mask registers 1115—in the example illustrated, there are 8 write mask registers (k0 through k7), each 64 bits in size. In an alternate example, the write mask registers 1115 are 16 bits in size. As previously described, in one example of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the example illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the example illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative examples of the disclosure may use wider or narrower registers. Additionally, alternative examples of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to examples of the disclosure. FIG. 12B is a block diagram illustrating both an exemplary example of an in-order architecture core and an exemplary register renaming, out-of-order issue/execution architecture core to be included in a processor according to examples of the disclosure. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one example, the core 1290 includes a microcode ROM or other medium that stores microcode for certain macro-instructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 1256, physical register file(s) unit(s) 1258, and execution cluster(s) 1260 are shown as being possibly plural because certain examples create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain examples are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary example, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

In certain examples, a prefetch circuit 1278 is included to prefetch data, for example, to predict access addresses and bring the data for those addresses into a cache or caches (e.g., from memory 1280).

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s)

1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one example, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated example of the processor also includes separate instruction and data cache units 1234/1274 and a shared L2 cache unit 1276, alternative examples may have a single internal cache for both instructions and data, such as, for example, a Level 1 (L1) internal cache, or multiple levels of internal cache. In some examples, the system may include a combination of an internal cache and an external cache that is external to the core and/or the processor. Alternatively, all of the cache may be external to the core and/or the processor.

Specific Exemplary In-Order Core Architecture

Figure 13B:
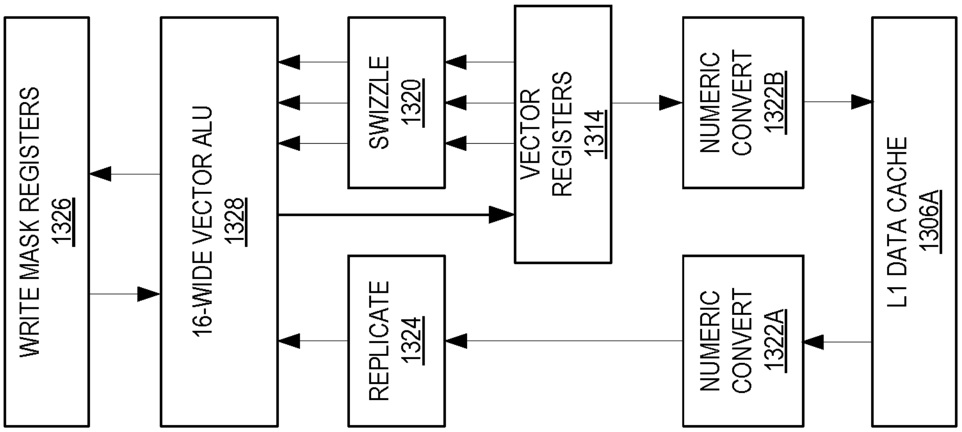
FIG. 13B is an expanded view of part of the processor core in FIG. 13A according to examples of the disclosure.
Figure 13A:
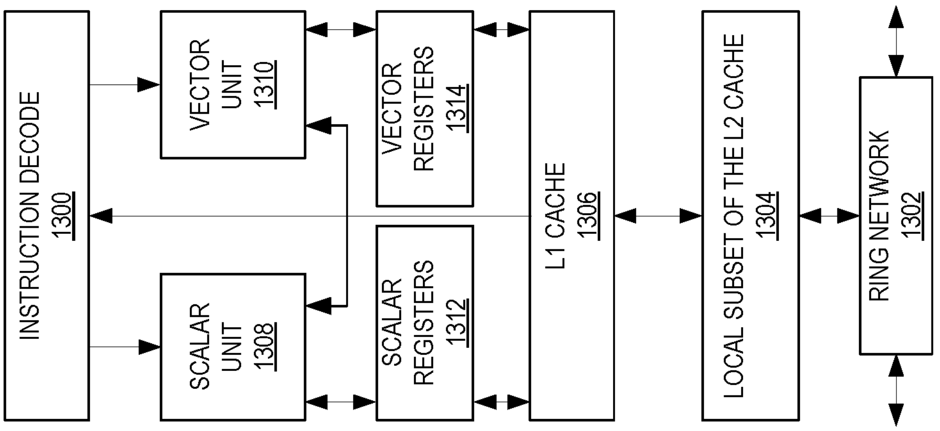
FIG. 13A is a block diagram of a single processor core, along with its connection to the on-die interconnect network and with its local subset of the Level 2 (L2) cache, according to examples of the disclosure.

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to examples of the disclosure. In one example, an instruction decode unit 1300 supports the x86 instruction set with a packed data instruction set extension. An L1 cache 1306 allows low-latency accesses to cache memory into the scalar and vector units. While in one example (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative examples of the disclosure may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to examples of the disclosure. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
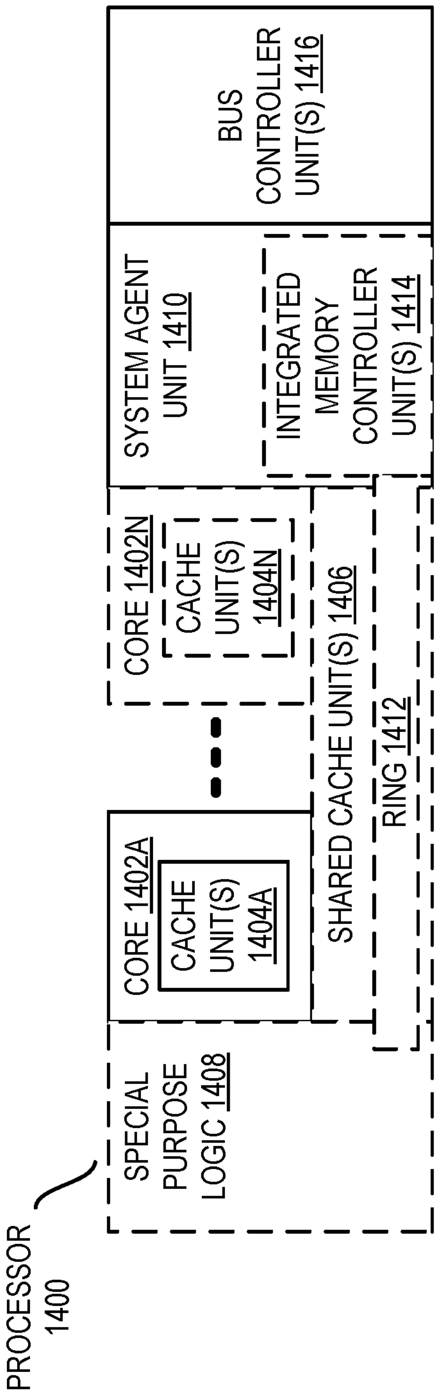
FIG. 14 is a block diagram of a processor that may have more than one core, may have an integrated memory controller, and may have integrated graphics according to examples of the disclosure.

FIG. 14 is a block diagram of a processor 1400 that may have more than one core, may have an integrated memory controller, and may have integrated graphics according to examples of the disclosure. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache 1404A-1404N within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one example a ring based interconnect unit 1412 interconnects the integrated graphics logic 1408, the set of shared cache units 1406, and the system agent unit 1410/integrated memory controller unit(s) 1414, alternative examples may use any number of well-known techniques for interconnecting such units. In one example, coherency is maintained between one or more cache units 1406 and cores 1402-A-N.

In some examples, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 15:
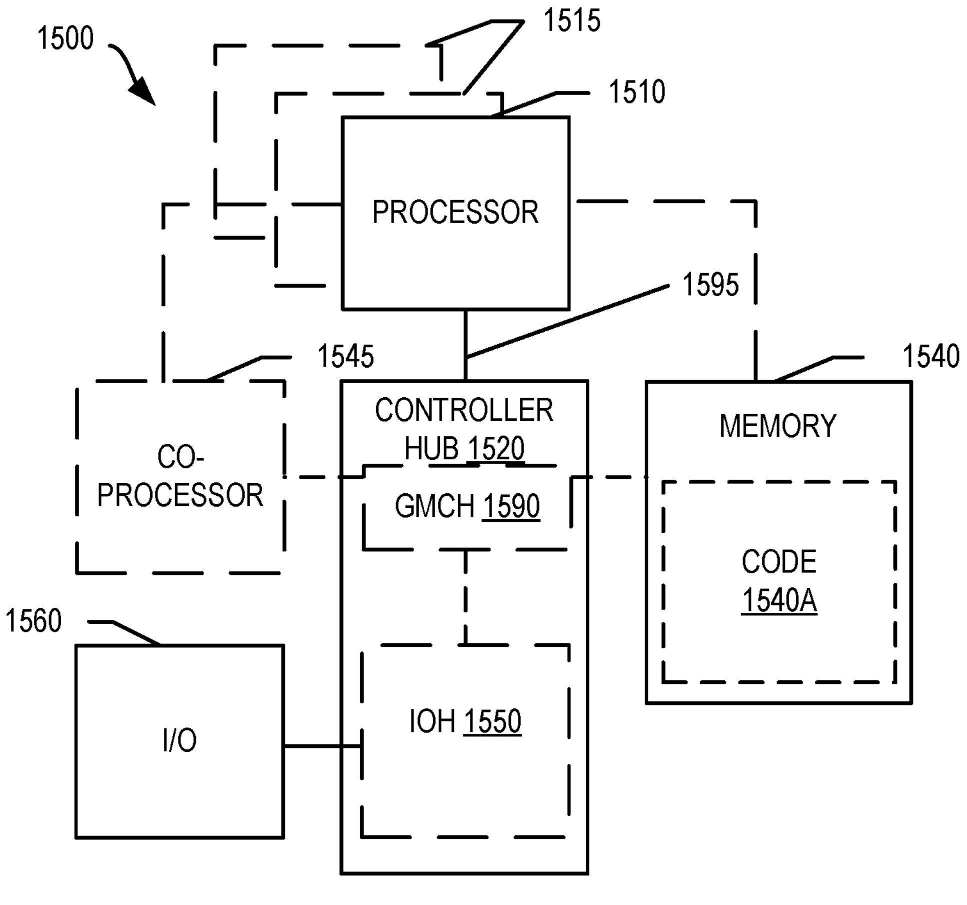
FIG. 15 is a block diagram of a system in accordance with one example of the present disclosure.

Referring now to FIG. 15, shown is a block diagram of a system 1500 in accordance with one example of the present disclosure. The system 1500 may include one or more processors 1510, 1515, which are coupled to a controller hub 1520. In one example the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550. Memory 1540 may include code 1540A, for example, to store code that when executed causes a processor to perform any method of this disclosure.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one example, the controller hub 1520 communicates with the processor(s) 1510, 1515 via a multi-drop bus, such as a frontside bus (FSB), point-to-point interface such as Quickpath Interconnect (QPI), or similar connection 1595.

In one example, the coprocessor 1545 is a special-purpose processor, such as, for example, a high-throughput MIC processor, a network or communication processor, compression engine, graphics processor, GPGPU, embedded processor, or the like. In one example, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one example, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
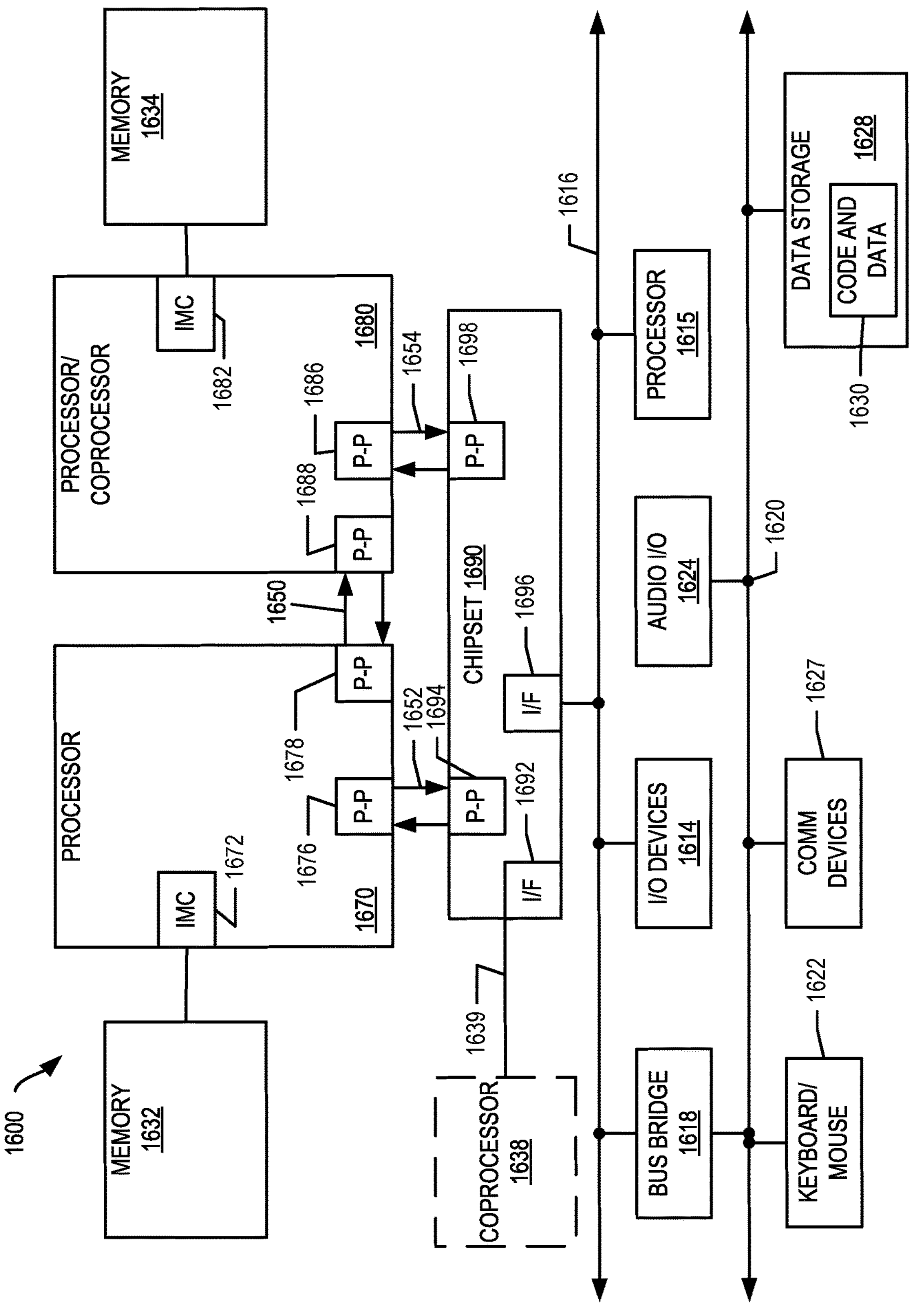
FIG. 16 is a block diagram of a more specific exemplary system in accordance with an example of the present disclosure.

Referring now to FIG. 16, shown is a block diagram of a first more specific exemplary system 1600 in accordance with an example of the present disclosure. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one example of the disclosure, processors 1670 and 1680 are respectively processors 1510 and 1515, while coprocessor 1638 is coprocessor 1545. In another example, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one example, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one example, first bus 1616 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 may be coupled to first bus 1616, along with a bus bridge 1618 which couples first bus 1616 to a second bus 1620. In one example, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one example, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one example. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
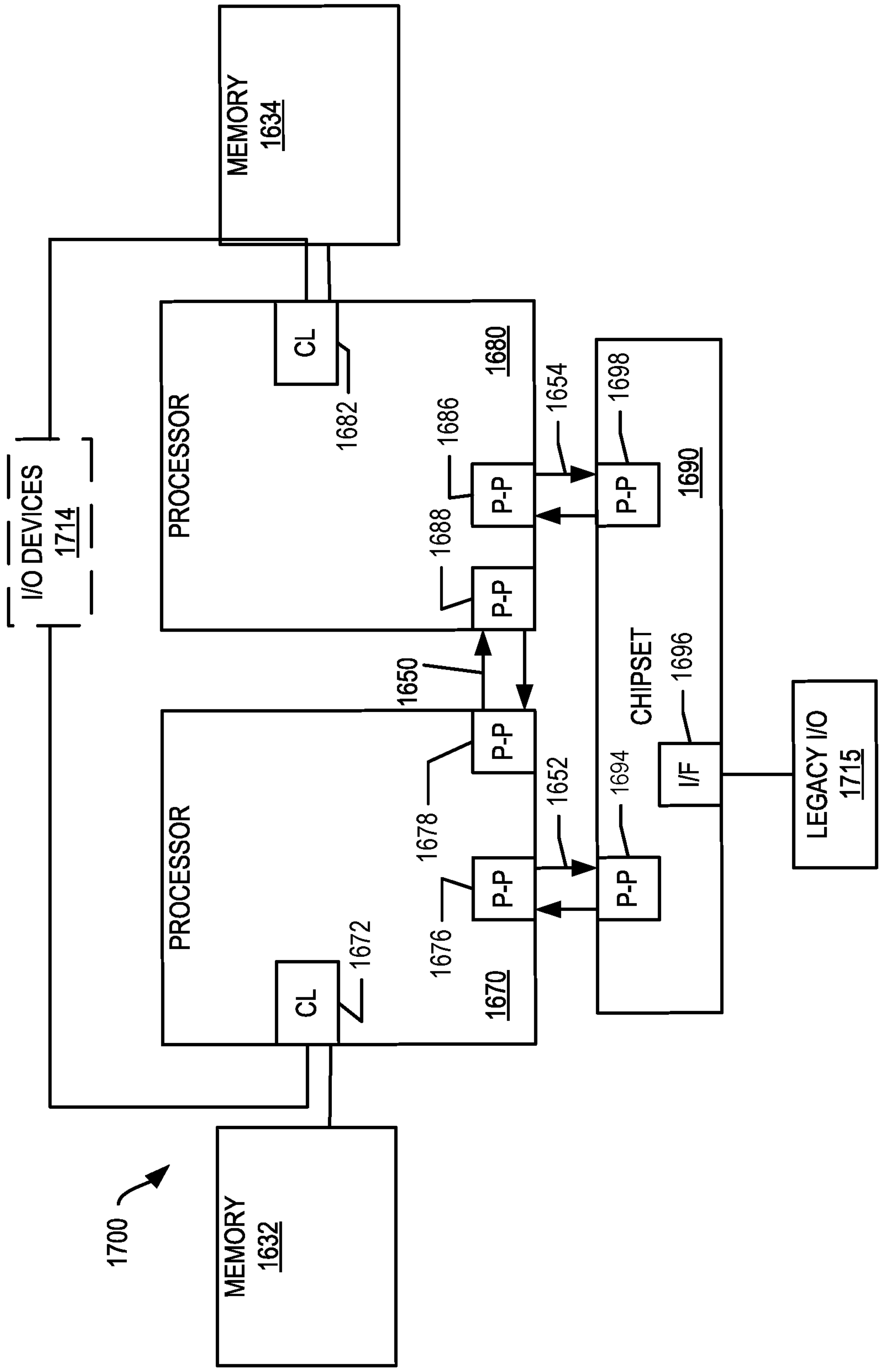
FIG. 17, shown is a block diagram of a second more specific exemplary system in accordance with an example of the present disclosure.

Referring now to FIG. 17, shown is a block diagram of a second more specific exemplary system 1700 in accordance with an example of the present disclosure. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
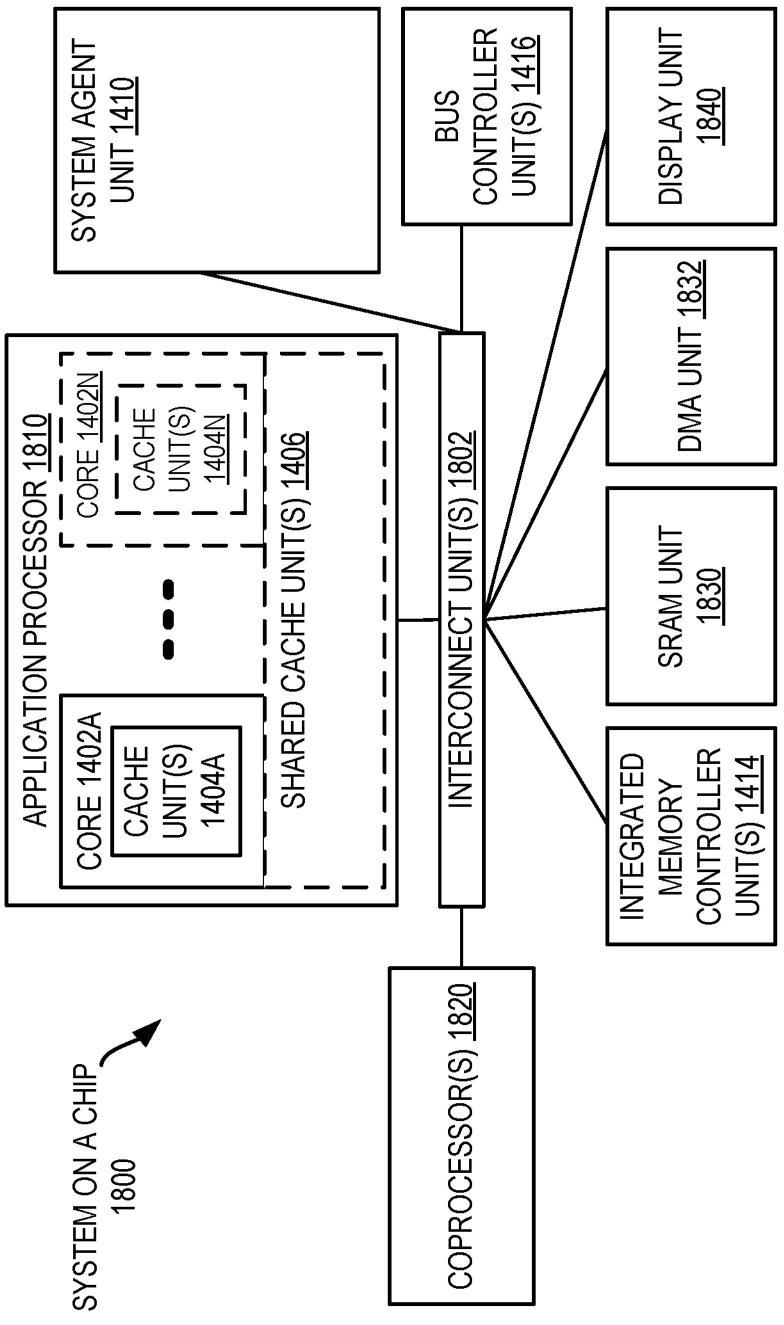
FIG. 18, shown is a block diagram of a system on a chip (SoC) in accordance with an example of the present disclosure.

Referring now to FIG. 18, shown is a block diagram of a SoC 1800 in accordance with an example of the present disclosure. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one example, the coprocessor(s) 1820 include a special-purpose processor, such as, for example, a network or communication processor, compression engine, GPGPU, a high-throughput MIC processor, embedded processor, or the like.

Examples (e.g., of the mechanisms) disclosed herein may be implemented in hardware, software, firmware, or a combination of such implementation approaches. Examples of the disclosure may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the disclosure also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
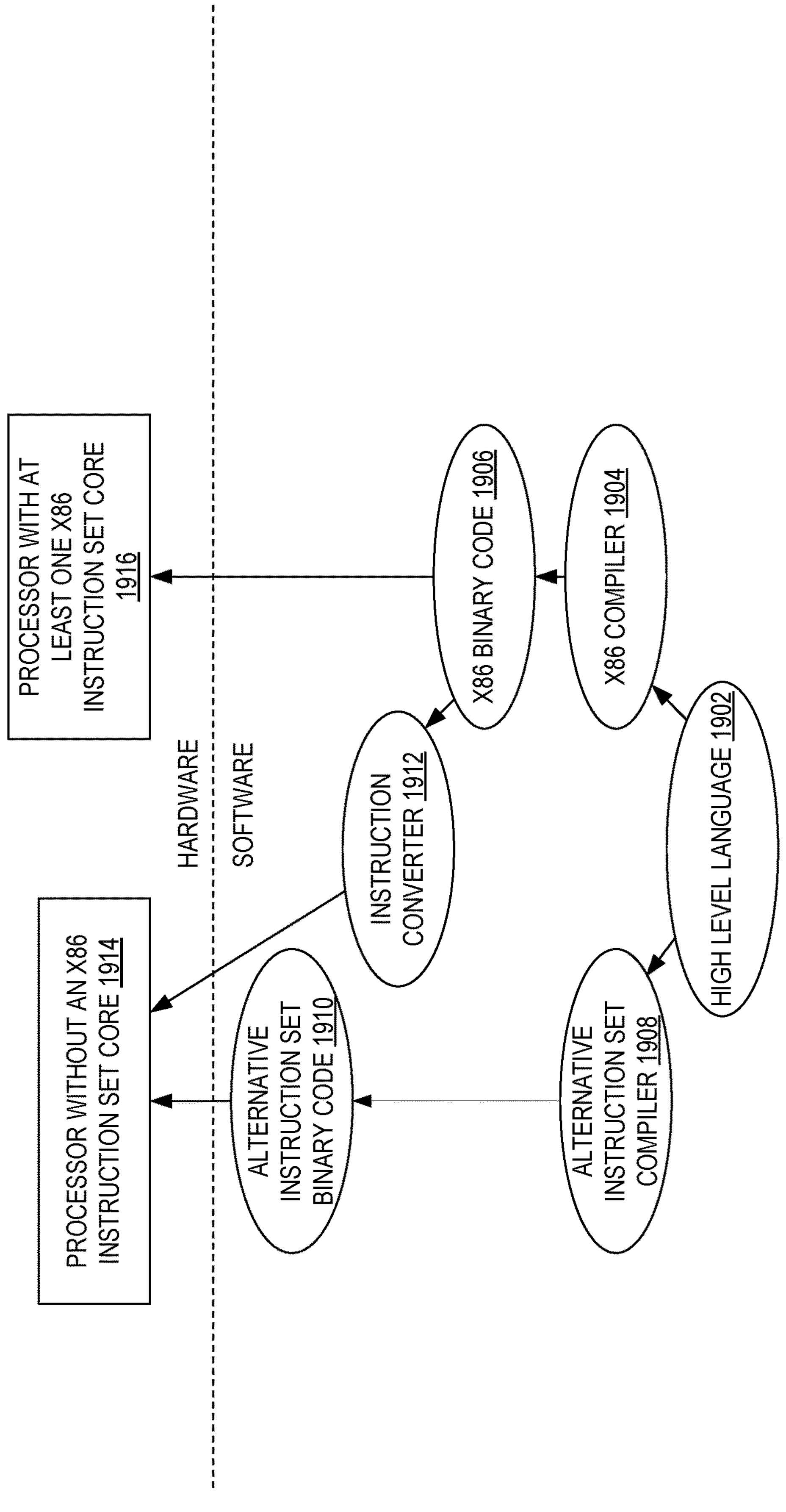
FIG. 19 is a block diagram contrasting the use of a software instruction converter to convert binary instructions in a source instruction set to binary instructions in a target instruction set according to examples of the disclosure.

FIG. 19 is a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, CA and/or that execute the ARM instruction set of ARM Holdings of Sunnyvale, CA). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation, or any other process, allows a processor or other electronic device that does not have an x86 instruction set processor or core to execute the x86 binary code 1906.

What is claimed is:

1. An apparatus comprising:

a capability management circuit to check a capability for a memory access request, the capability comprising an address field and a bounds field that is to indicate a lower bound and an upper bound of an address range to which the capability authorizes access;

a decoder circuit to decode a single instruction into a decoded single instruction, the single instruction comprising one or more fields to indicate a first compartment descriptor that identifies a first capability to a first state element in a first compartment of memory and a second capability to a second state element in the first compartment of the memory, and an opcode to indicate that an execution circuit is to load the first capability from the first compartment descriptor of the memory into a first register to enable the capability management circuit to determine whether a first bounds field of the first capability authorizes an access to the first state element in the first compartment of the memory, and load the second capability from the first compartment descriptor of the memory into a second register to enable the capability management circuit to determine that a second bounds field of the second capability authorizes an access to the second state element in the first compartment of the memory; and the execution circuit to execute the decoded single instruction according to the opcode, wherein:

the one or more fields of the single instruction indicate a second compartment descriptor that identifies a third capability to a third state element in a second compartment of the memory and a fourth capability to a fourth state element in the second compartment of the memory; and the opcode is to further indicate that the execution circuit is to, before the load of the first capability from the first compartment descriptor of the memory into the first register, and the load of the second capability from the first compartment descriptor of the memory into the second register, store the third capability from the first register into the second compartment descriptor of the memory, and store the fourth capability from the second register into the second compartment descriptor of the memory.

2. The apparatus of claim 1, wherein the one or more fields comprise a first compartment descriptor capability that comprises a first compartment descriptor address field of the first compartment descriptor in the memory and a first compartment descriptor bounds field that is to indicate a lower bound and an upper bound of the first compartment descriptor in the memory, and the opcode is to further indicate that the execution circuit is to access the first compartment descriptor in the memory in response to a determination by the capability management circuit that a first compartment descriptor address from the first compartment descriptor address field is within the lower bound and the upper bound from the first compartment descriptor bounds field.

3. The apparatus of claim 1, wherein the opcode is to further indicate that the execution circuit is to:

set a busy flag of the second compartment descriptor before the load of the first capability from the first compartment descriptor of the memory into the first register, and the load of the second capability from the first compartment descriptor of the memory into the second register to stall the load of the first capability from the first compartment descriptor of the memory into the first register, and stall the load of the second capability from the first compartment descriptor of the memory into the second register; and clear the busy flag in response to completion of the store of the third capability from the first register into the second compartment descriptor of the memory, and the store of the fourth capability from the second register into the second compartment descriptor of the memory.

4. The apparatus of claim 1, wherein the opcode is to further indicate that the execution circuit is to clear the first register and the second register before the load of the first capability from the first compartment descriptor of the memory into the first register, and the load of the second capability from the first compartment descriptor of the memory into the second register.

5. The apparatus of claim 1, wherein:

the first compartment descriptor is to store a third set of state elements; and the opcode is to further indicate that the execution circuit is to load the third set of state elements from the first compartment descriptor into a third set of registers.

6. The apparatus of claim 5, wherein the first compartment descriptor comprises a bitmap field to indicate a proper subset of the third set of registers to load the third set of state elements into.

7. The apparatus of claim 1, wherein:

the decoder circuit is to decode a second single instruction into a decoded second single instruction, the second single instruction comprising one or more fields to indicate a location of the first compartment descriptor in the memory to store the first capability to the first state element in the first compartment of the memory and the second capability to the second state element in the first compartment of the memory, and an opcode to indicate that the execution circuit is to initialize the memory at the location in a format of a compartment descriptor with space for the first capability and the second capability; and the execution circuit to execute the decoded second single instruction according to its opcode.

8. A method comprising:

checking, by a capability management circuit of a processor core, a capability for a memory access request, the capability comprising an address field and a bounds field that is to indicate a lower bound and an upper bound of an address range to which the capability authorizes access;

decoding, by a decoder circuit of the processor core, a single instruction into a decoded single instruction, the single instruction comprising one or more fields to indicate a first compartment descriptor that identifies a first capability to a first state element in a first compartment of memory and a second capability to a second state element in the first compartment of the memory, and an opcode indicating that an execution circuit of the processor core is to load the first capability from the first compartment descriptor of the memory into a first register to enable the capability management circuit to determine whether a first bounds field of the first capability authorizes an access to the first state element in the first compartment of the memory, and load the second capability from the first compartment descriptor of the memory into a second register to enable the capability management circuit to determine that a second bounds field of the second capability authorizes an access to the second state element in the first compartment of the memory; and executing, by the execution circuit, the decoded single instruction according to the opcode, wherein:

the one or more fields of the single instruction indicate a second compartment descriptor that identifies a third capability to a third state element in a second compartment of the memory and a fourth capability to a fourth state element in the second compartment of the memory; and the opcode further indicates that the execution circuit is to, before the load of the first capability from the first compartment descriptor of the memory into the first register, and the load of the second capability from the first compartment descriptor of the memory into the second register, store the third capability from the first register into the second compartment descriptor of the memory, and store the fourth capability from the second register into the second compartment descriptor of the memory.

9. The method of claim 8, wherein the one or more fields comprise a first compartment descriptor capability that comprises a first compartment descriptor address field of the first compartment descriptor in the memory and a first compartment descriptor bounds field that is to indicate a lower bound and an upper bound of the first compartment descriptor in the memory, and the opcode is to further indicate that the execution circuit is to access the first compartment descriptor in the memory in response to a determination by the capability management circuit that a first compartment descriptor address from the first compartment descriptor address field is within the lower bound and the upper bound from the first compartment descriptor bounds field.

10. The method of claim 8, wherein the opcode further indicates that the execution circuit is to:

set a busy flag of the second compartment descriptor before the load of the first capability from the first compartment descriptor of the memory into the first register, and the load of the second capability from the first compartment descriptor of the memory into the second register to stall the load of the first capability from the first compartment descriptor of the memory into the first register, and stall the load of the second capability from the first compartment descriptor of the memory into the second register; and clear the busy flag in response to completion of the stores of the third capability from the first register into the second compartment descriptor of the memory, and the store of the fourth capability from the second register into the second compartment descriptor of the memory.

11. The method of claim 8, wherein the opcode further indicates that the execution circuit is to clear the first register and the second register before the load of the first capability from the first compartment descriptor of the memory into the first register, and the load of the second capability from the first compartment descriptor of the memory into the second register.

12. The method of claim 8, wherein:

the first compartment descriptor stores a third set of state elements; and the opcode further indicates that the execution circuit is to load the third set of state elements from the first compartment descriptor into a third set of registers.

13. The method of claim 12, wherein the first compartment descriptor comprises a bitmap field that indicates a proper subset of the third set of registers to load the third set of state elements into.

14. The method of claim 8, further comprising:

decoding, by the decoder circuit, a second single instruction into a decoded second single instruction, the second single instruction comprising one or more fields to indicate a location of the first compartment descriptor in the memory to store the first capability to the first state element in the first compartment of the memory and the second capability to the second state element in the first compartment of the memory, and an opcode to indicate that the execution circuit is to initialize the memory at the location in a format of a compartment descriptor with space for the first capability and the second capability; and executing, by the execution circuit, the decoded second single instruction according to its opcode.

15. A non-transitory machine readable medium that stores code that when executed by a machine causes the machine to perform a method comprising:

checking, by a capability management circuit of a processor core, a capability for a memory access request, the capability comprising an address field and a bounds field that is to indicate a lower bound and an upper bound of an address range to which the capability authorizes access;

decoding, by a decoder circuit of the processor core, a single instruction into a decoded single instruction, the single instruction comprising one or more fields to indicate a first compartment descriptor that identifies a first capability to a first state element in a first compartment of memory and a second capability to a second state element in the first compartment of the memory, and an opcode indicating that an execution circuit of the processor core is to load the first capability from the first compartment descriptor of the memory into a first register to enable the capability management circuit to determine that a first bounds field of the first capability authorizes an access to the first state element in the first compartment of the memory, and load the second capability from the first compartment descriptor of the memory into a second register to enable the capability management circuit to determine that a second bounds field of the second capability authorizes an access to the second state element in the first compartment of the memory; and executing, by the execution circuit, the decoded single instruction according to the opcode, wherein:

the one or more fields of the single instruction indicate a second compartment descriptor that identifies a third capability to a third state element in a second compartment of the memory and a fourth capability to a fourth state element in the second compartment of the memory; and the opcode further indicates that the execution circuit is to, before the load of the first capability from the first compartment descriptor of the memory into the first register, and the load of the second capability from the first compartment descriptor of the memory into the second register, store the third capability from the first register into the second compartment descriptor of the memory, and store the fourth capability from the second register into the second compartment descriptor of the memory.

16. The non-transitory machine readable medium of claim 15, wherein the one or more fields comprise a first compartment descriptor capability that comprises a first compartment descriptor address field of the first compartment descriptor in the memory and a first compartment descriptor bounds field that is to indicate a lower bound and an upper bound of the first compartment descriptor in the memory, and the opcode is to further indicate that the execution circuit is to access the first compartment descriptor in the memory in response to a determination by the capability management circuit that a first compartment descriptor address from the first compartment descriptor address field is within the lower bound and the upper bound from the first compartment descriptor bounds field.

17. The non-transitory machine readable medium of claim 15, wherein the opcode further indicates that the execution circuit is to:

set a busy flag of the second compartment descriptor before the load of the first capability from the first compartment descriptor of the memory into the first register, and the load of the second capability from the first compartment descriptor of the memory into the second register to stall the load of the first capability from the first compartment descriptor of the memory into the first register, and stall the load of the second capability from the first compartment descriptor of the memory into the second register; and clear the busy flag in response to completion of the store of the third capability from the first register into the second compartment descriptor of the memory, and the store of the fourth capability from the second register into the second compartment descriptor of the memory.

18. The non-transitory machine readable medium of claim 15, wherein the opcode further indicates that the execution circuit is to clear the first register and the second register before the load of the first capability from the first compartment descriptor of the memory into the first register, and the load of the second capability from the first compartment descriptor of the memory into the second register.

19. The non-transitory machine readable medium of claim 15, wherein:

the first compartment descriptor stores a third set of state elements; and the opcode further indicates that the execution circuit is to load the third set of state elements from the first compartment descriptor into a third set of registers.

20. The non-transitory machine readable medium of claim 19, wherein the first compartment descriptor comprises a bitmap field that indicates a proper subset of the third set of registers to load the third set of state elements into.

21. The non-transitory machine readable medium of claim 15, wherein the method further comprises:

decoding, by the decoder circuit, a second single instruction into a decoded second single instruction, the second single instruction comprising one or more fields to indicate a location of the first compartment descriptor in the memory to store the first capability to the first state element in the first compartment of the memory and the second capability to the second state element in the first compartment of the memory, and an opcode to indicate that the execution circuit is to initialize the memory at the location in a format of a compartment descriptor with space for the first capability and the second capability; and executing, by the execution circuit, the decoded second single instruction according to its opcode.

* * * * *